US012807253B2

(12) United States Patent
Goodloe et al.

(10) Patent No.: US 12,807,253 B2
(45) Date of Patent: Nov. 24, 2026

(54) VEHICLE TRACK PAD ASSEMBLY

(71) Applicant: Transportation IP Holdings, LLC, Norwalk, CT (US)

(72) Inventors: John Bennett Goodloe, Fayetteville, NC (US); James Wesley Sugg, Pinehurst, NC (US); Richard Frederick Atherton, Fayetteville, NC (US)

(73) Assignee: Transportation IP Holdings, LLC, Norwalk, CT (US)

( * ) Notice: Subject to any disclaimer, the term of this patent is extended or adjusted under 35 U.S.C. 154(b) by 537 days.

(21) Appl. No.: 18/350,123

(22) Filed: Jul. 11, 2023

(65) Prior Publication Data

US 2024/0025498 A1 Jan. 25, 2024

Related U.S. Application Data

(60) Provisional application No. 63/391,171, filed on Jul. 21, 2022.

(51) Int. Cl.
*B62D 55/26* (2006.01)
*B62D 55/275* (2006.01)
*B62D 55/28* (2006.01)

(52) U.S. Cl.
CPC ........... *B62D 55/26* (2013.01); *B62D 55/275* (2013.01); *B62D 55/28* (2013.01)

(58) Field of Classification Search
CPC ....... B62D 55/26; B62D 55/275; B62D 55/28
See application file for complete search history.

(56) References Cited

U.S. PATENT DOCUMENTS 3,261,646 A * 7/1966 Pax ........................ A43B 13/24 156/114
4,588,233 A * 5/1986 DenBesten .......... B62D 55/275 305/51
5,630,657 A * 5/1997 Kumano ................ B62D 55/26 305/192
5,800,026 A * 9/1998 Nagata ................. B62D 55/275 305/191
8,011,739 B2 * 9/2011 Busley ................. B62D 55/275 305/189
10,787,211 B2 * 9/2020 Kim ....................... B62D 55/26
(Continued)

OTHER PUBLICATIONS

"Hybrid Track Systems" brochure (1 page).

*Primary Examiner* — Jason R Bellinger
(74) *Attorney, Agent, or Firm* — K&L Gates LLP

(57) ABSTRACT

A track shoe includes a base plate with a first linear edge perpendicular to a first axis extending along a movement direction. The base plate has a second edge spaced from the first edge and perpendicular to the first axis. A first and second side extend from the first edge to the second edge. One or both of the first or second side include: (a) first continuous curved edge extending from the first edge to the second edge, (b) plural first linear side edges interconnected with at least two of the linear side edges transversely oriented at non-perpendicular angles to the first and second edge; (c) a second curved edge and second linear side edges on opposite sides of the second curved edge, the second linear side edges extending from the first and second edges to the second curved edge; or (d) two or more curved edges without linear edge.

11 Claims, 26 Drawing Sheets

(56) References Cited

U.S. PATENT DOCUMENTS

| | | | | |
|---|---|---|---|---|
| 2003/0102715 | A1* | 6/2003 | Watanabe | B62D 55/244<br>305/177 |
| 2011/0148187 | A1 | 6/2011 | Lyons | |

* cited by examiner

VEHICLE TRACK PAD ASSEMBLY

CROSS-REFERENCE TO RELATED APPLICATIONS

This application claims priority to U.S. Provisional Application No. 63/391,171, filed on Jul. 21, 2022, the entire disclosure of which is incorporated herein by reference.

BACKGROUND

Technical Field

Examples of the subject matter herein relate to track pads for continuous track vehicles.

Discussion of Art

Continuous track vehicles (e.g., bulldozers and tanks) may run on a continuous band of treads or track shoes driven by two or more wheels. For track shoes, the track shoes may be attached to one another sequentially in an articulated manner to form the continuous band. Alternatively, a chain or other set of articulated links may form the continuous band, with individual track shoes bolted to the links. Either way, the track shoes may be grouser shoes, referring to bare track shoes that include features (e.g., metal protuberances, textured surfaces, crossbars, or other treads) for facilitating traction in loose surfaces such as mud, soft soil, sand, and snow.

While grouser shoes or bare track shoes increase vehicle traction in loose surfaces, the bare track shoes may cause damage to a road surface if the vehicle is driven over a paved or sealed road. Therefore, some continuous track vehicles are outfitted with elastomeric track pads. Due to heavy vehicle weight and operating conditions (e.g., turning on a relatively tight radius), track shoes may be subject to significant stresses, including torsional stresses. This may result in the track shoes wearing out undesirably quickly, the track pads shearing off from the underlying metal base plate, or the like. Additionally, track shoes may be shaped such that there may be damage to the track shoe from travelling along uneven surface or from repeated wear and tear over the surface traveled. This results in material loss at the end of the track shoe, material deformation, or the like.

Therefore, it may be desirable to provide a vehicle track pad assembly that differs from existing track shoes.

BRIEF DESCRIPTION

In accordance with one example or aspect, a track shoe for a vehicle track pad assembly includes a base plate having a first elongated linear edge that is perpendicular to a first axis of a base plate body that extends along a movement direction of the base plate. The base plate has a second elongated linear edge spaced apart from the first elongated linear edge and perpendicular to the first axis. A first side extends from the first elongated linear edge to the second elongated linear edge. A second side extends from the first elongated linear edge to the second elongated linear edge. At least one of the first side or the second side include: (a) a first continuous curved edge extending from the first elongated linear edge to the second elongate linear edge; (b) plural first linear side edges interconnected with each other with at least two of the first linear side edges transversely oriented at non-perpendicular angles to the first elongated linear edge and the second linear edge; (c) a second curved edge and second linear side edges on opposite sides of the second curved edge; or (d) two or more curved edges without any linear edges.

In accordance with one example or aspect, a track shoe for a vehicle track pad assembly includes a base plate and a polymer pad coupled with the base plate. The polymer pad is elongated from a first side to an opposite second side along a lateral direction. The polymer pad extends from a first linear edge to an opposite second linear edge along a movement direction. The first side extends from the first linear edge to the second linear edge. The polymer pad includes one or more middle chamfered surfaces disposed at one or more of the first side or the second side. The one or more chamfered surfaces extending along the first side or the second side a chamfer length that is 90% or less of a length between the first linear edge and the second linear edge.

In accordance with one example or aspect, a track shoe for a vehicle track pad assembly includes a base plate and a polymer pad. The base plate may include a first elongated linear edge that is perpendicular to a first axis of a base plate body that extends along a movement direction of the base plate. The base plate has a second elongated linear edge spaced apart from the first elongated linear edge and perpendicular to the first axis. A first side extends from the first elongated linear edge to the second elongated linear edge. A second side extends from the first elongated linear edge to the second elongated linear edge. At least one of the first side or the second side include: (a) a first continuous curved edge extending from the first elongated linear edge to the second elongate linear edge; (b) plural first linear side edges interconnected with each other with at least two of the first linear side edges transversely oriented at non-perpendicular angles to the first elongated linear edge and the second linear edge; (c) a second curved edge and second linear side edges on opposite sides of the second curved edge; or (d) two or more curved edges without any linear edges. The polymer pad may be coupled with the base plate. The polymer pad may be elongated from a first side of the polymer pad to an opposite second side of the polymer pad along a lateral direction. The polymer pad may extend from a first linear edge of the polymer pad to an opposite second linear edge of the polymer pad along the movement direction. The first side of the polymer pad may extend from the first linear edge of the polymer pad to the second linear edge of the polymer pad. The polymer pad may include one or more middle chamfered surfaces disposed at one or more middle chamfered surfaces extending a chafer length along the first side of the polymer pad or the second side of the polymer pad. The chamfer length may be 90% or less of a length between the first linear edge of the polymer pad and the second linear edge of the polymer pad.

BRIEF DESCRIPTION OF THE DRAWINGS

The inventive subject matter may be understood from reading the following description of non-limiting examples, with reference to the attached drawings, wherein below.

DETAILED DESCRIPTION

Examples of the subject matter described herein relate to track shoes for continuous track vehicles. Continuous track vehicles (e.g., some mining vehicles, bulldozers, tanks, etc.) may run on a continuous band of treads or track shoes driven by two or more wheels. For track shoes, the track shoes may be attached to one another sequentially in an articulated manner to form the continuous band. Alternatively, a chain or other set of articulated links may form the continuous band, with individual track shoes bolted to the links. Either way, the track shoes may be grouser shoes, referring to a bare base plate that include features (e.g., metal protuberances, textured surfaces, crossbars, or other treads) for facilitating traction in loose surfaces such as mud, soft soil, sand, and snow.

While bare track shoes with a textured surface may increase vehicle traction in loose surfaces, the bare track shoes may cause damage to a road surface if the vehicle is driven over a paved or sealed road. Additionally, if the base plate of the track shoe has sharp corners, angles, or other edges, especially at an end of the base plate, these portions of the base plate may be vulnerable to material loss and/or material deformation. In one aspect of the present subject matter, portions of the base plate may have softer angles or more round shapes at end portions which limit material loss and breakage, especially when the vehicle is travelling over uneven surfaces.

Figure 1:
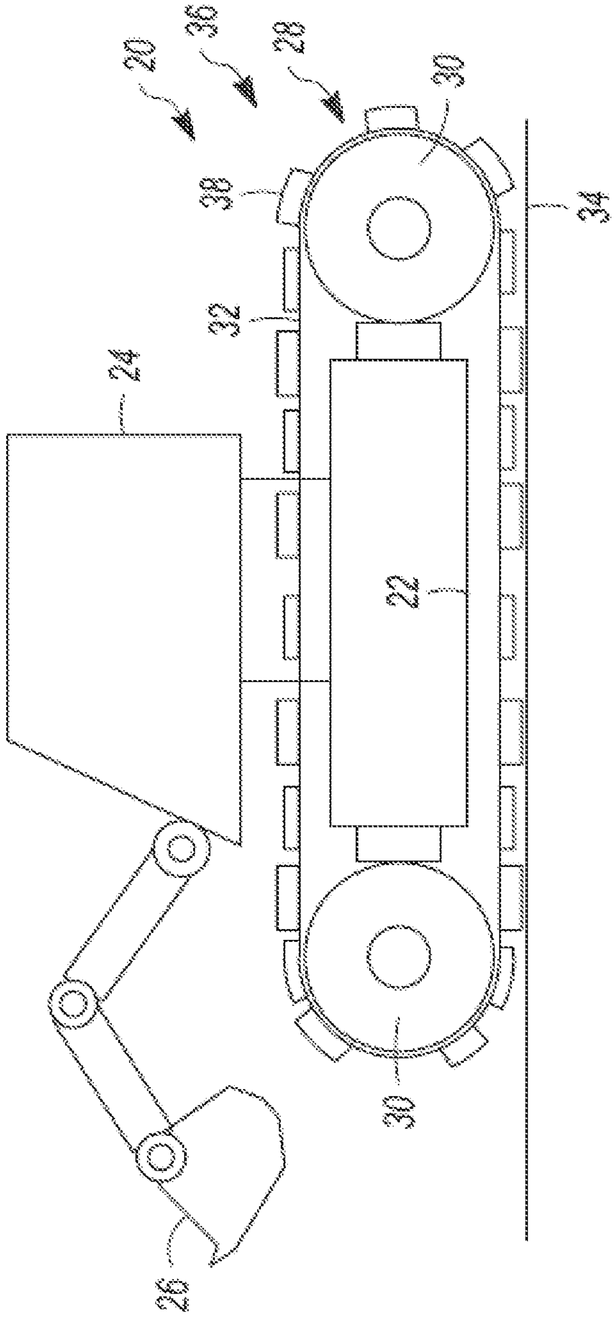
FIG. 1 is a side view of a vehicle, according to one example.

FIG. 1 illustrates an example of a vehicle 20 (e.g., a continuous track vehicle) which may include a chassis 22, an operator cab 24 supported by the chassis, a work tool 26 (e.g., back hoe, front end dumper, scoop blade, military weapon) operably attached to the cab and/or to the chassis, and a continuous track drive 28 attached to the chassis and configured to be selectively electrically and/or mechanically powered for vehicle movement. The continuous track drive may include front and rear axle-mounted wheel units 30 and a continuous chain track 32. The chain track is operably connected to and between the two wheel units, e.g., via sprockets, such that when the wheels are rotated in concert (under operation of a motor-driven gear unit, or a transmission driven by an engine, for example), the chain track is actuated in a given direction along the ground surface 34 that supports the vehicle, for vehicle movement. The chain track may include plural track shoes 36, at least some of which may be track pad assemblies 38 as described herein. (For example, the chain track may include only track pad assemblies, or a combination of interspersed track pad assemblies and base plates, and/or one or more of the track pad assemblies attached to underlying base plate(s)). The track shoes may be directly connected to one another in an articulated manner to form the continuous chain track, or the track shoes may be coupled to one or more underlying continuous chains or other sets of articulated links, e.g., a continuous loop of articulated links that interconnects and is driven by the wheel units, with the track shoes attached to the links and moving along therewith.

Figure 2:
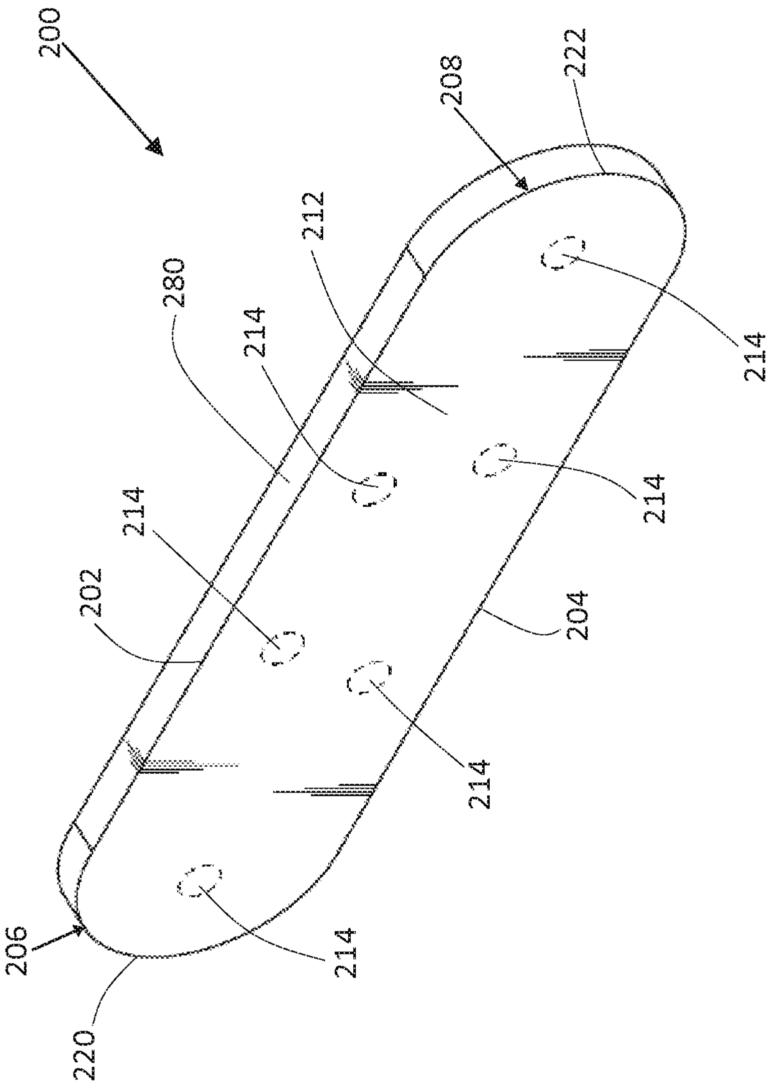
FIG. 2 is a perspective view of a base plate, according to one example.

FIG. 2 is a perspective view showing one example of an attachment surface 212 of a base plate 200 for the track shoe of the vehicle track pad assembly. The attachment surface may be positioned to couple the track shoe and base plate to the vehicle, such as to the continuous track chain. The base plate may include apertures 214 extending entirely or partially through a thickness of the base plate and positioned such that fasteners (shown in FIG. 35) may secure the base plate to the vehicle. The fasteners may include bolts, screws, cylindrical metal shafts welded to the base plate, or the like. The base plate and fasteners may be made of a metal, e.g., steel, titanium, or aluminum alloy. The base plate and fasteners may be the same material or different materials. The apertures may be arranged in line with one another, may be staggered from each other, or may be randomly arranged on the attachment surface. The apertures may be arranged based on a desired use case for the base plate. As shown in FIG. 2, the base plate may have six total apertures, with four interior apertures arranged in a trapezoidal shape and an aperture on each external side from the four interior apertures. Optionally, a greater number or fewer number of apertures may be provided and/or the apertures may be arranged in different locations of the base plate. While FIGS.

2 through 19 show bare base plates, the fully formed track shoe may include the base plate covered by a covering, such as a polymer pad described below.

Figure 3:
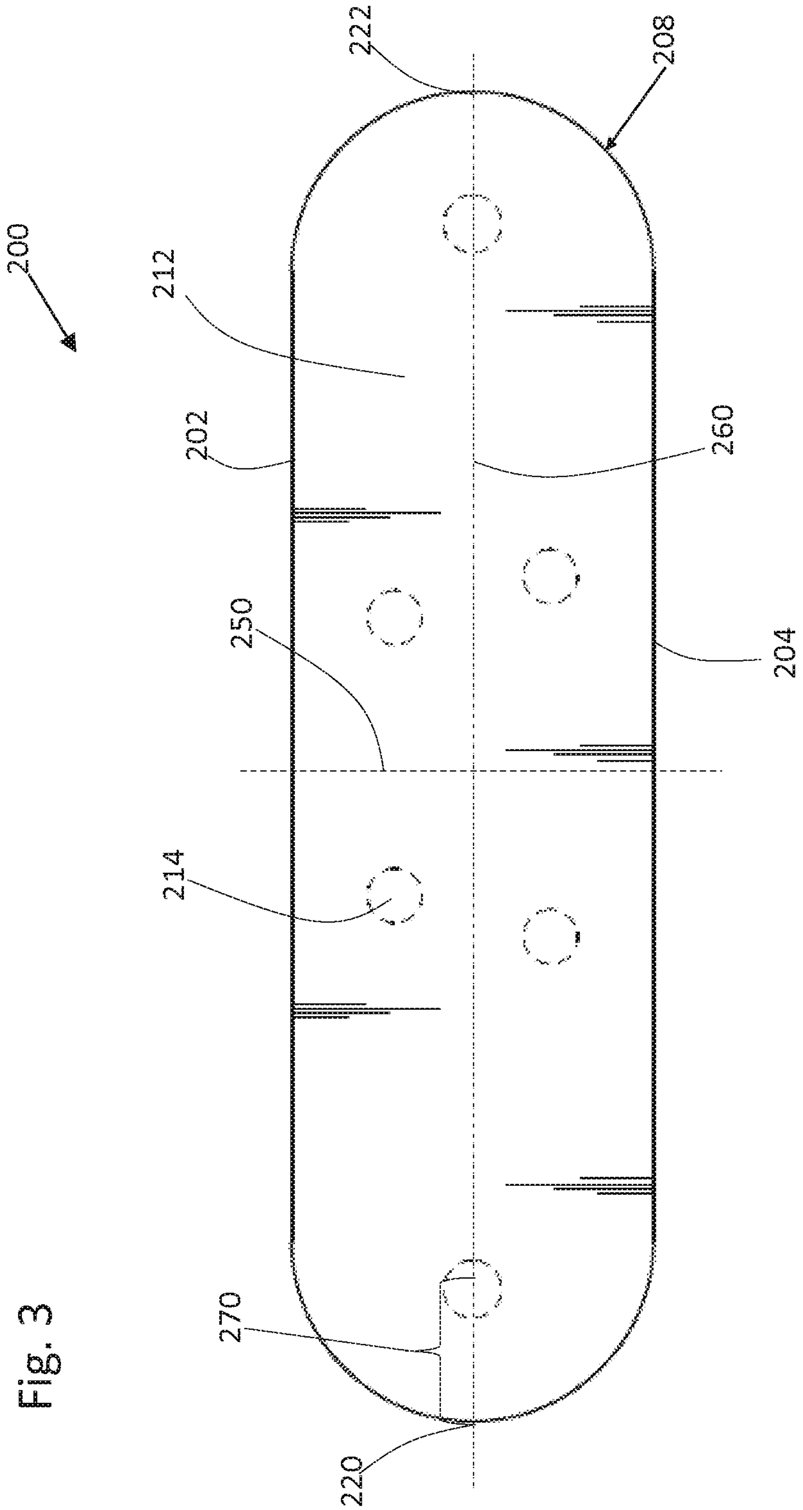
FIG. 3 is a plan view of a back side of the base plate shown in FIG. 2.

FIG. 3 illustrates a plan view showing one example of the attachment surface of the base plate for the track shoe. The base plate may include a forward (e.g., first) elongated linear edge 202 that is transverse (e.g., perpendicular or oriented at an acute or obtuse angle) to a movement axis 250 of the base plate. In one example, the forward linear edge is transverse but not perpendicular to the first axis, but rather the forward linear edge is transverse to the movement axis at an acute or obtuse angle. The movement axis extends along the movement direction of the base plate. For example, the movement axis may be referred to as a first axis of the base plate with the base plate and track shoe moving along the movement axis on the continuous track drive of the vehicle.

A rearward (e.g., second) elongated linear edge 204 may be spaced apart from the first elongated linear edge and is transverse (e.g., non-parallel, such as oriented at a perpendicular, acute, or obtuse angle) to the movement axis. In one example, the rearward elongated linear edge may be rearward of the first elongated linear edge along the movement axis. Said another way, the first elongated linear edge may be a leading edge in the direction of forward movement and the rearward elongated linear edge may be a trailing edge of the direction of forward movement. However, if the vehicle moves in reverse, the first elongated linear edge may be in the reverse direction of movement relative to the second elongated linear edge. Said another way, when the vehicle moves in the reverse direction, the first elongated linear edge may be the trailing edge and the rearward elongated linear edge may be the leading edge. The base plate has a transverse axis 260 that is oriented transverse (e.g., perpendicular) to the movement axis. For example, the transverse axis may be referred to as a second axis of the base plate with the base plate and track shoe moving transverse to the second axis on the continuous track drive of the vehicle. In one example, the first and second elongated linear edges may extend in the direction of the second axis and may be generally parallel to one another. In another example, the first and second elongated linear edges may not be parallel to one another. For example, the first elongated linear edge may be angled relative to the second elongated linear edge, the second elongated linear edge may be angled relative to the second elongated linear edge, or both the first and second elongated linear edges are angled relative to each other. In one example, it may be advantageous to have the first elongated linear edge angled relative to the second elongated linear edge as this may create a desirable shaped base plate, (e.g., the base plate may be bigger at one end than at the other end). This may be desirable based on the vehicle the base plate may be attached to or based on the surface on which the base plate will travel.

The base plate may also include a first side 206 and a second side 208 each extending from the first elongated linear edge to the second elongated linear edge. In one example, the first elongated linear edge, the second elongated linear edge, the first side, and the second side may all be coplanar and define outer boundaries of the base plate. The first and second sides may generally be on opposite sides of the base plate from one another. In one example, the first side and the second side may include a continuous curved edge extending from the first elongated linear edge to the second elongated linear edge. The continuous curved edge may be convex, concave, a sigmoid curve, or another curved shape that does not include a straight or linear portion. When compared to substantially linear side edges traditionally found on track shoes, the continuous curved edge may help reduce the possibility of material loss at the ends of the base plate, specifically when the vehicle is travelling over uneven surfaces or over obstacles. The continuous curved edges may allow the weight and pressure to be spread across the lateral portions of track shoe and the base plate, rather than concentrating the weight and pressure at a sharp corner portion or pressure point. This distribution of weight and pressure may allow for increased durability and a longer life cycle for the base plate and the track shoes. Additionally, the continuous curved edges may provide an appealing and streamlined aesthetic to customers.

In the example illustrated in FIGS. 2 through 11, the continuous curved edges may be convex. In one example, the first side and the second side may be symmetric about the first axis. Where the first side and the second side are symmetric about the first axis, the first side and the second side may have the same slope or rate of change along the length of the first side and the second side, respectively. Said another way, the first side and second side may be mirror images about the first axis. However, in other examples, the first side and the second side may be asymmetric about the first axis. For example, the first side and the second side may have differing slopes between the first elongated linear edge and the second elongated linear edge. It may be advantageous for the first side and second side to be asymmetric about the first axis depending on the objective of the vehicle. For example, the first side may generally need to extend further laterally than the second side for a given task, such as travelling in an area with a low clearance height on one side. In this scenario, it may be beneficial to have the first side be more curved than the second side and thus be asymmetrical about the first axis. The opposite may also be true, where it may be beneficial for the second side to be more curved than the first side.

Figure 13:
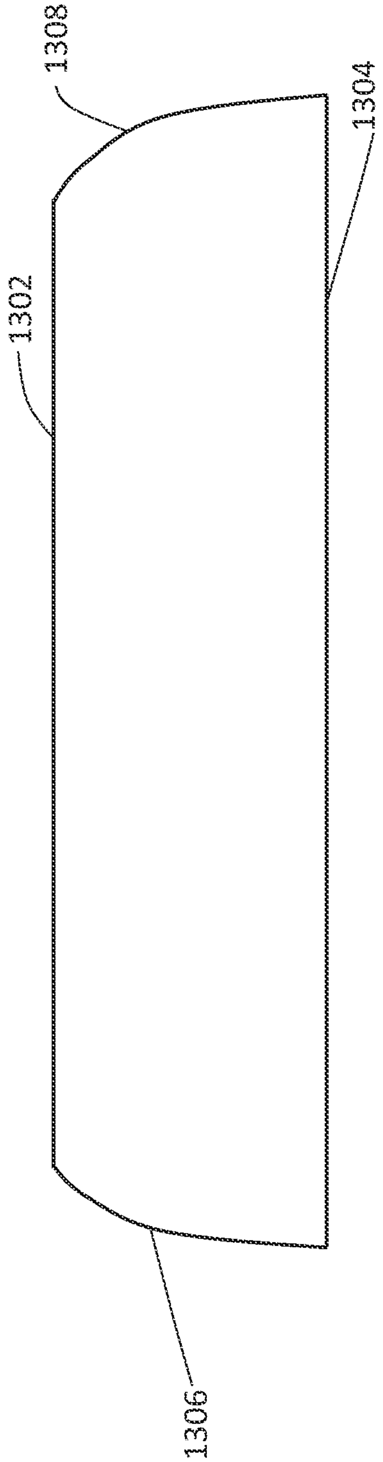
FIG. 13 is a plan view of a back side of a base plate, according to one example.
Figure 14:
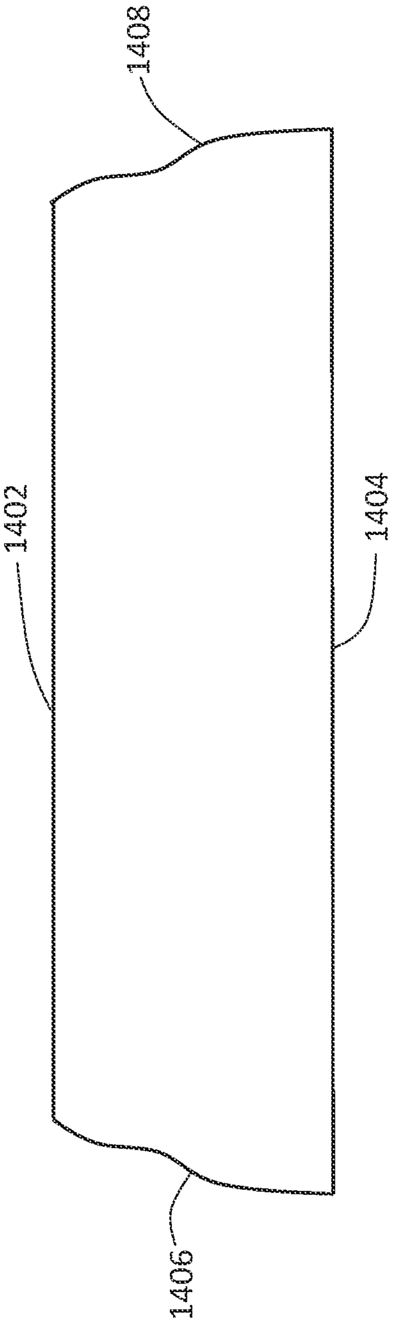
FIG. 14 is a plan view of a back side of a base plate, according to one example.

One or both of the first side and the second side may be symmetrical about the second axis of the base plate. As shown in FIGS. 2 through 12, both the first side and the second side may be symmetric about the second axis. In these instances, the first side and the second side also happen to have the same slope between the first elongated edge and the second elongated edge, thus the first side and the second side may be symmetrical about both the first axis and the second axis. However, in other examples, the first side and the second side may have different slopes between the first elongated edge and the second elongated edge. That is, both the first side and the second side may be symmetrical about the second axis, but the first side and the second side may be asymmetrical about the first axis. The first side and the second side may both be asymmetrical about the second axis, as shown in FIGS. 13 and 14. Both the first side and the second side may be symmetrical about the first axis but not the second axis, as shown in FIGS. 13 and 14. Conversely, both the first side and the second side may be asymmetrical about the second axis and may be asymmetrical about the first axis.

The first continuous curved edge (e.g., the first side) may have a radius of curvature 270, as shown in FIG. 3. The first side and the second side may have the same radius of curvature or different radius of curvatures. As used herein, the same radius of curvature may be a common value or a value within manufacturing tolerance. The radius of curvature may be based on or may change based on the length of the base plate, as measured from a first distal end 220 of the first side to a second distal end 222 of the second side along the second axis. For example, as the length of the base plate increases, the radius of curvature may increase. As the length of the base plate decreases, the radius of curvature may decrease. As the length of the base plate increases, the radius of curvature may decrease. As the length of the base plate decreases, the radius of curvature may increase. In one example, the radius of curvature may be at least 10% of the length of the base plate. In one example, the radius of curvature may be between 11% and 25% of the length of the base plate. In one example, the radius of curvature may be generally half the length as a length of the base plate measured from the first elongated linear edge to the second elongated linear edge. As used herein, the generally may mean within 5% of each other. A smaller radius of curvature may result in a rounder first and second continuous curved edges. A greater radius of curvature may result in a less round, more straight first and second continuous curved edges. The radius of curvature and roundness of the first and second continuous curved edges may be selected based on anticipated use of the base plate and the track shoe.

Figure 12:
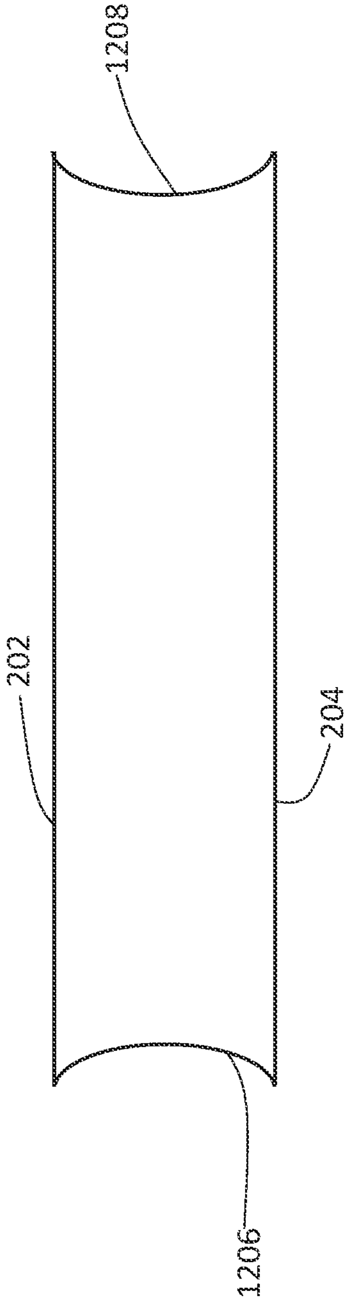
FIG. 12 is a plan view of a back side of a base plate, according to one example.

In the example illustrated in FIG. 12, the continuous curved edges 1206 and 1208 may be concave. The first side and second side may have the same radius of curvature, as shown in FIG. 12, and the base plate may be generally symmetrical about the first axis. However, in one example, the first side and the second side may have different radius of curvatures and the base plate may be generally asymmetrical about the first axis. Where the continuous curved edge is concave, the first side and the second side may extend within the first and second elongated linear edges. This arrangement may provide additional protection for the first and second sides because the first elongated edge and the second elongated edge may absorb a majority of the force and pressure from the surface being travelled across during movement. As such, this arrangement may reduce material loss or damage, especially on the first side and the second side. The radius of curvature may be modified to adjust how much of the continuous curved edges may extend within the first and second elongated linear edges.

In the example illustrated in FIG. 13, continuous curved edges 1306 and 1308 may be a partial parabola-type curve. The partial parabola-type curve may vary in steepness depending on desired use for the base plate and the track shoe. The gradual curve may result in a more distributed force on the base plate against the surface and may inhibit material loss of the track shoe, specifically at the first and second sides. Additionally, where the continuous curved edge is a gradual curve, a first elongated linear edge 1302 may be shorter than a second elongated linear edge 1304. In another embodiment, the second elongated linear edge may be the same length as the first elongated linear edge, or the second elongated linear edge may be shorter than the first elongated linear edge. It may be advantageous to have the first and second elongated linear edges be different lengths. For example, if the second elongated linear edge is longer and the second elongated linear edge is a leading edge in the forward direction of movement, it may create a larger surface area for the track shoe during movement and may distribute the force more evenly. Said another way, the second elongated linear edge may be the leading edge relative to the first elongated linear edge in the forward direction of movement. This may create less pressure on the first elongated linear edge and the side edges following the longer second elongated edge. In one example, it may be beneficial if the second elongated linear edge is shorter, and the second elongated linear edge is the leading edge in the forward direction of movement. The smaller surface area along the leading edge may be beneficial to establish a foundation for track shoes to travel on. These arrangements may help to distribute the weight to match the strength of the base plate and the track shoe. By distributing the force more evenly, wear and tear on the track shoe may be reduced.

In the embodiment illustrated in FIG. 14, the continuous curved edges 1406 and 1408 may be a sigmoidal-shaped curve. The slope of the curve may change between the first elongated linear edge 1402 and the second elongated linear edge 1404. By varying the slope of the curved edges, the base plate may be customized to have a wider lateral length at a given portion of the first side and/or the second side. This may allow for more material strength at desired locations, such as pressure points or other points that may be susceptible to breakage or material loss. Additionally, the base plate may be customized to have a shorter lateral length at a given portion if flexibility may be more desirable at the portion of the base plate. This arrangement may also allow for a wider base at the second elongated linear edge to provide added support and a narrower portion at the first elongated linear edge to reduce stress at the leading edge in the forward direction of movement and reduce stress on the track shoe.

Figure 4:
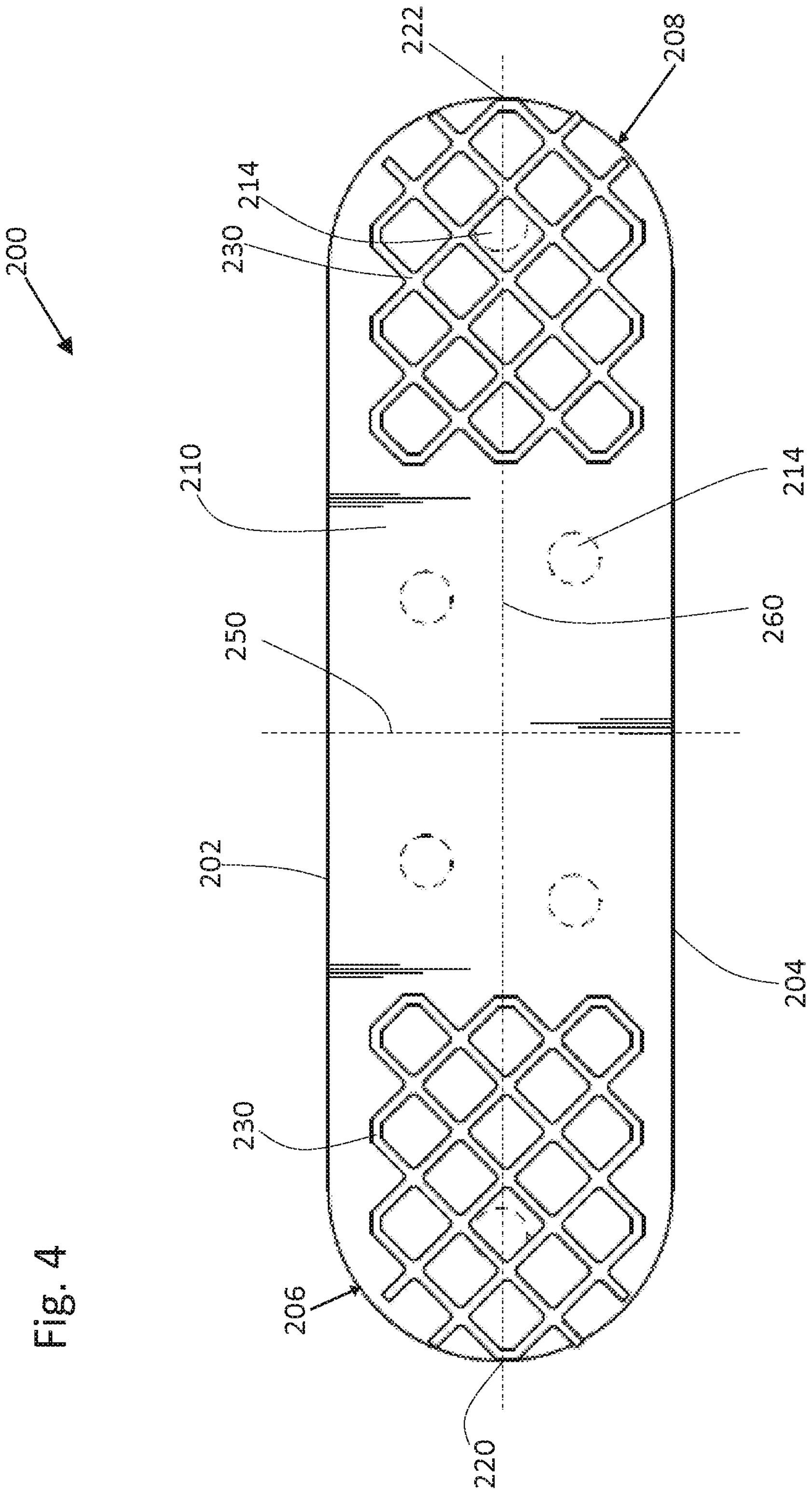
FIG. 4 is a plan view of a front side of the base plate shown in FIG. 2.
Figure 5:
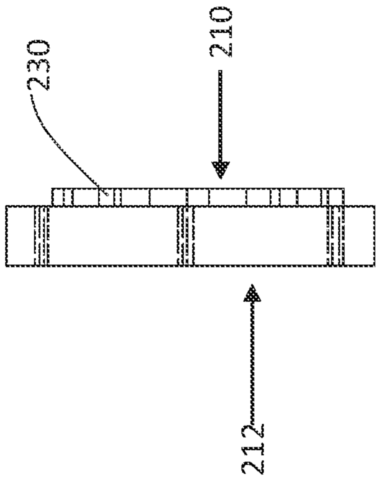
FIG. 5 is a side view of the base plate shown in FIG. 2.
Figure 6:
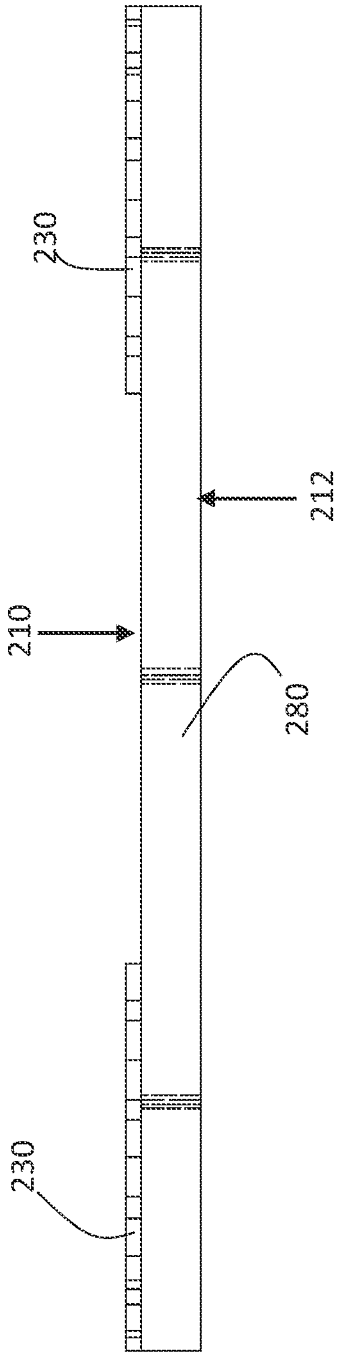
FIG. 6 is a top view of the base plate shown in FIG. 2.
Figure 7:
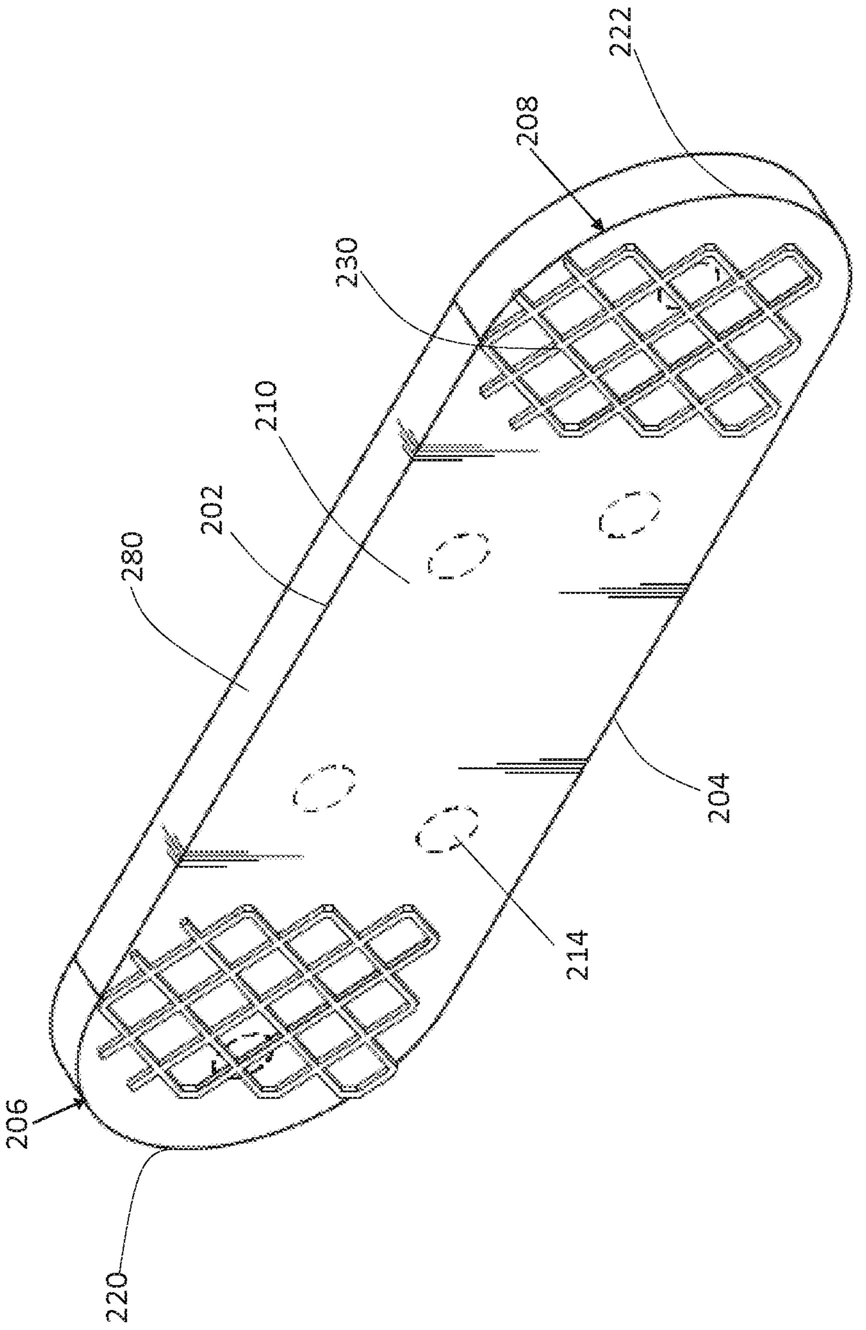
FIG. 7 is a perspective view of a base plate, according to one example.
Figure 8:
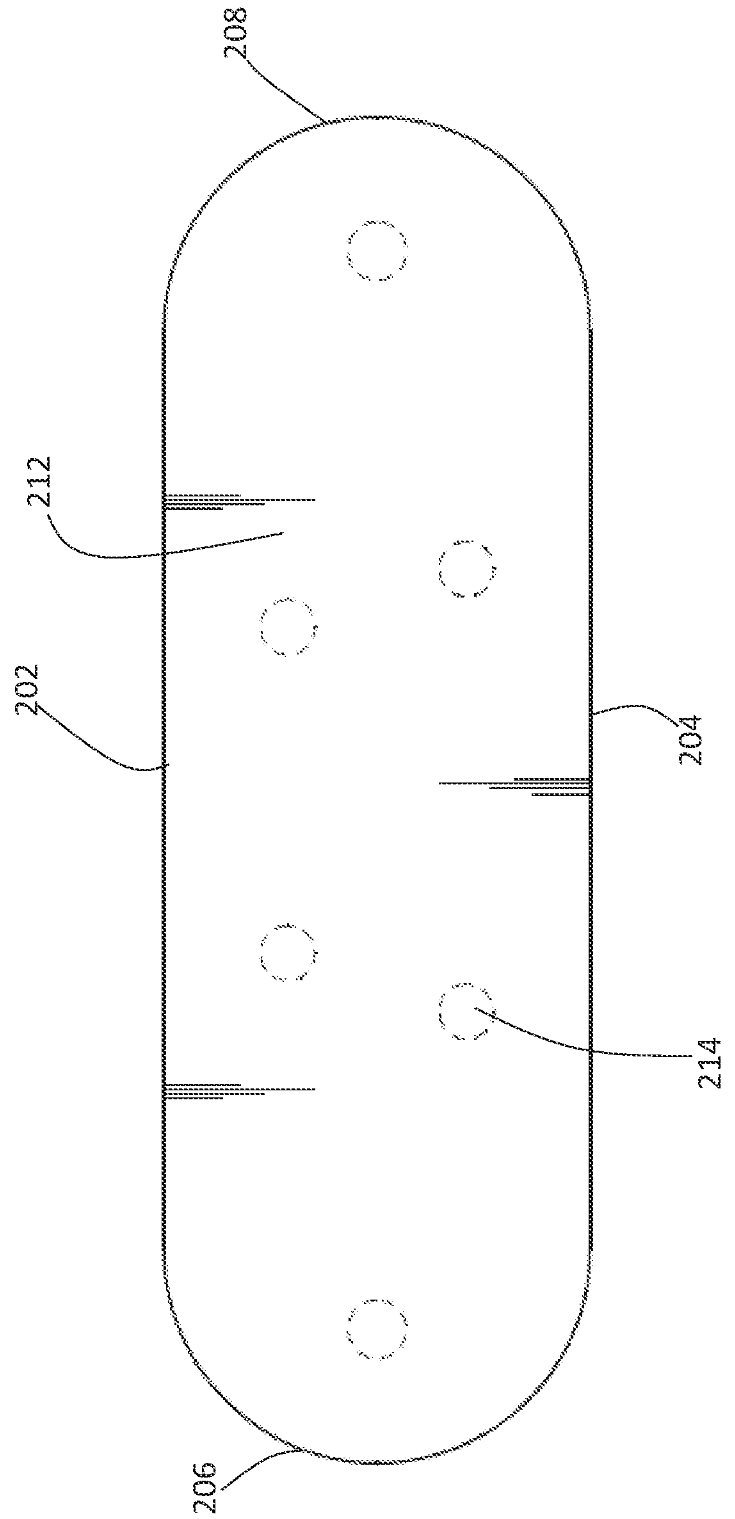
FIG. 8 is a plan view of a back side of the base plate shown in FIG. 7.

FIG. 4 is a plan view of a front side of the base plate. The front side may include a traction surface 210 positioned in the direction of a surface being travelled by the track shoe. The traction surface may be opposite the attachment surface. For example, the traction surface may be the side of the base plate that would face the ground or other vehicle support surface when the vehicle track pad assembly is deployed. The attachment surface and the traction surface may be separated by a top side 280, shown in FIGS. 2 and 6. The top side may generally be considered the thickness of the base plate. The thickness may be modified based on desired use. For example, it may be desirable to have a greater thickness when the surface to be travelled may have a high density or high likelihood of damaging the base plate. The added thickness may improve longevity of the base plate. Alternatively, where the surface has a low density, such as sand or loosely packed dirt, it may be more efficient to have a smaller thickness. The traction surface may have the plurality of apertures seen on the attachment side.

Figure 9:
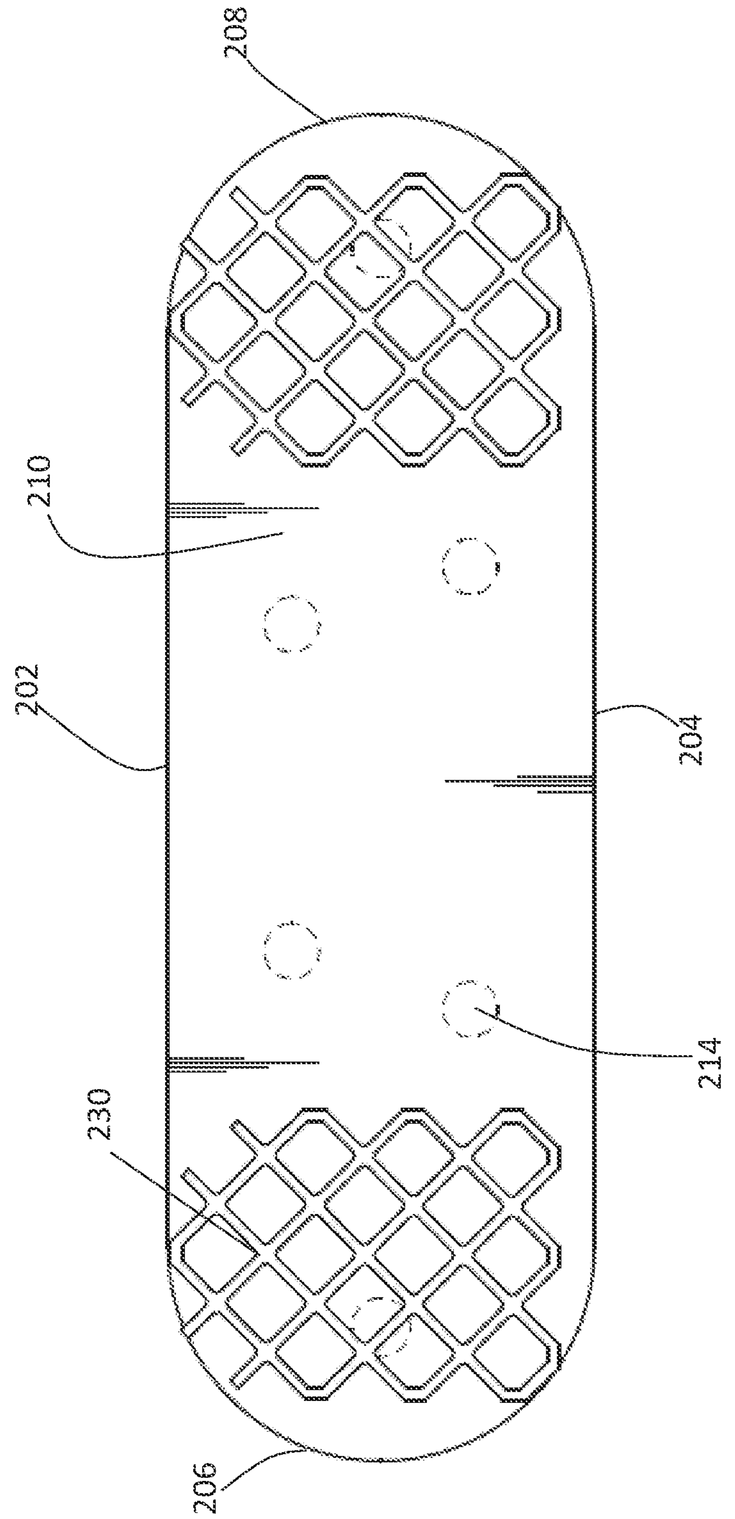
FIG. 9 is a plan view of a front side of the base plate shown in FIG. 7.
Figure 10:
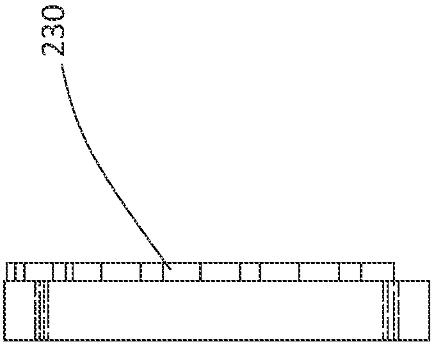
FIG. 10 is a side view of the base plate shown in FIG. 7.
Figure 11:
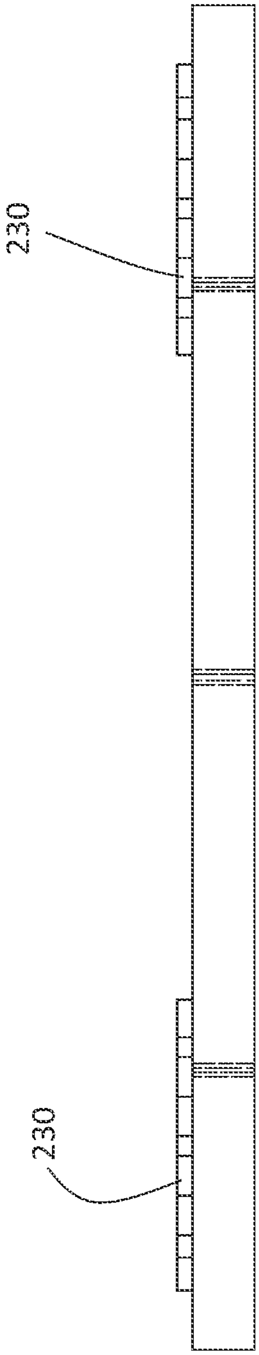
FIG. 11 is a top view of the base plate shown in FIG. 7.

The traction surface may include a textured surface. In the embodiment illustrated in FIGS. 4 through 11, a textured body 230 is coupled with the traction surface of the base plate. The textured body may include one or more mesh arrays. In the embodiment illustrated in FIG. 4, the mesh arrays may extend to the first distal end, the second distal end, or to both the first and second distal ends. By having the mesh arrays extend to the first and second distal ends, the added material may help strengthen the distal ends against material loss or deformation. In one example, the mesh array may extend continuously from the first distal end to the second distal end. In the example illustrated in FIGS. 7 and 9, the mesh arrays may be positioned near the first and second sides but may not extend to the first and second distal ends. The mesh array may extend to either one, or both of the first elongated linear edge and the second elongated linear edge. In the embodiment illustrated in FIG. 9, the mesh array may extend to the first elongated linear edge but may not extend all the way to the second elongated linear edge. In the embodiment illustrated in FIG. 4, the mesh array may not extend all the way to either the first elongated linear edge or the second elongated linear edge. The positioning of the mesh arrays on the traction surface may be selected based on the designated or predicted use of the track shoe. One or more apertures may be positioned within the mesh array, as shown in FIGS. 4 and 9. The aperture may be positioned to be exposed through the lattice structure of the mesh array to allow for the base plate to be coupled to the vehicle.

In one example, the textured surface may be attached to the traction surface of the base plate. For example, the textured surface may be welded to the base plate, e.g., either entirely along all seams/regions of contact, or by way of multiple discrete weld spots (e.g., 15-25 weld spots per textured surface). Alternatively, the textured surface could be attached to the base plate using an adhesive, brazing, or the like. As another example, the textured surface could be formed as a metal powder pattern which is subsequently solidified and attached to the base plate using sintering. In another example, the textured surface could be integrally formed with the base plate during manufacturing of the base plate. For example, the base plate could be formed using metal casting, where the casting mold includes array-shaped grooves for forming the arrays on the base plate, as part of the metal of the base plate. Other examples include machining the base plate and arrays (from a larger starting block of metal), additive manufacturing, stamping, or the like. In an example, the mesh arrays may comprise a metal mesh, e.g., steel or stainless steel, such as an expanded metal mesh, a grid stamped from sheet metal, wire mesh, woven wire mesh, woven metal strip mesh, mechanically interconnected wire mesh (e.g., heavy gauge chicken wire), etc. As one example illustrated in FIGS. 5, 6, 10, and 11, a thickness of the mesh array in a direction normal to the tread surface of the track plate (corresponding to a maximum cross dimension of the strips of the mesh, e.g., diameter, thickness, or width) may be from 2-3 mm. As can be appreciated from the top view, the thickness of the mesh array may be smaller than the overall thickness of the base plate, as measured along the top side. In one example, the thickness of the base plate as measured along the top side may be between 5-50 mm.

Figure 15:
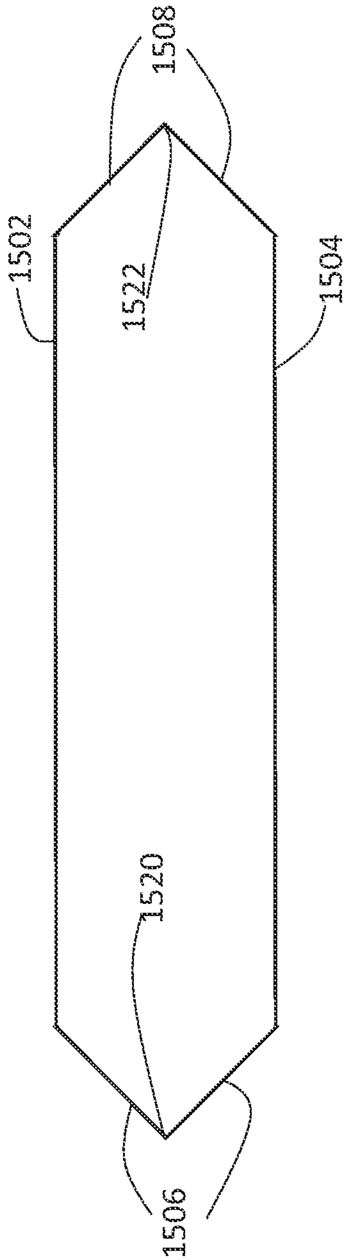
FIG. 15 is a plan view of a back side of a base plate, according to one example.

At least one of the first side and the second side may include plural first linear side edges that are interconnected with each other. As shown in FIG. 15, the first linear side edges 1506 may connect to one another at a distal point 1520. The second linear side edges 1508 may connect to one another at a second distal point 1522. The first linear side edges may be connected opposite the distal points to the first elongated edge 1502 and the second elongated edge 1504, respectively. At least two of the first linear side edges are oriented transversely at non-perpendicular angles to the first elongated linear edge and the second elongated linear edge. As illustrated in FIG. 15, the distal point extends beyond the first and second elongated linear edges.

Figure 16:
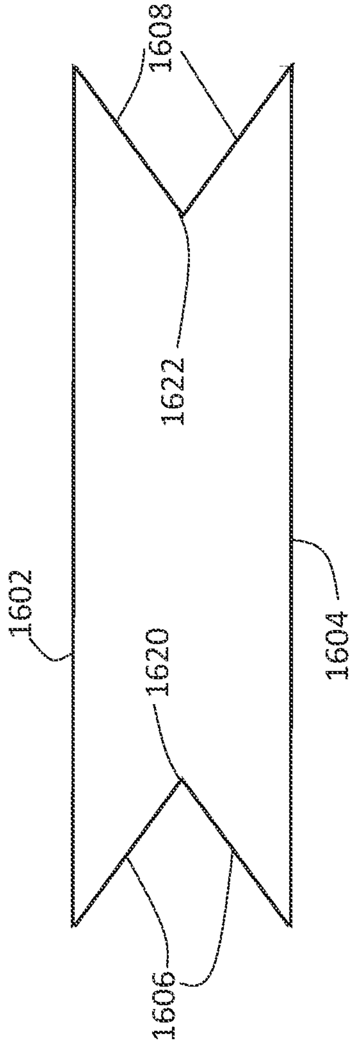
FIG. 16 is a plan view of a back side of a base plate, according to one example.

FIG. 16 illustrates an example where the plural first linear side edges 1606 may be connected to one another at an interior point 1620. The plural second linear side edges 1608 may be connected to one another at a second interior point 1622. The first linear side edges may be connected opposite the interior points to the first elongated edge 1602 and the second elongated edge 1604, respectively. The plural first linear side edges connecting at the interior points may help protect the side edges and reduce material loss and shearing.

Figure 17:
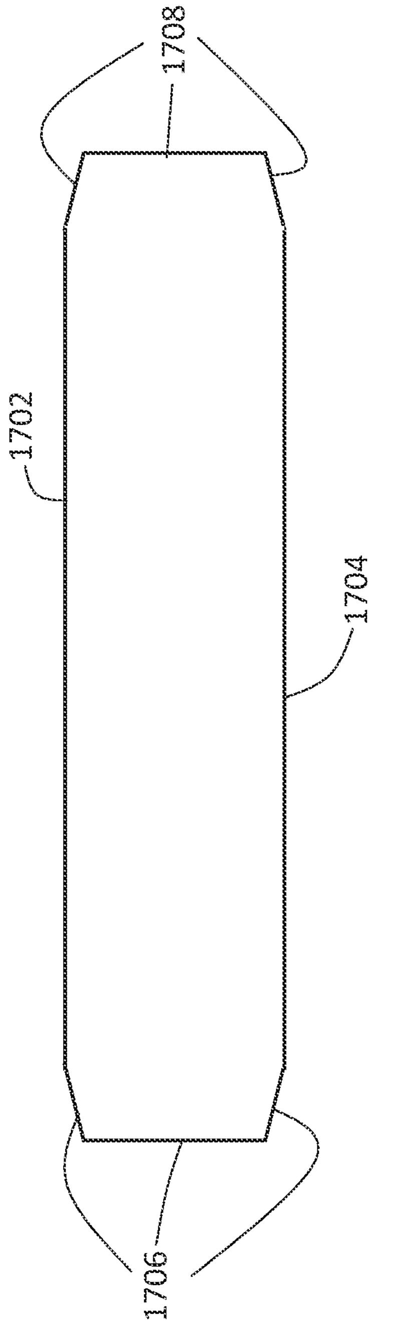
FIG. 17 is a plan view of a back side of a base plate, according to one example.

FIG. 17 illustrates an example where the plural first linear side edges 1706 may be connected in a trapezoidal shape beyond a first elongated edge 1702 and a second elongated edge 1704. The plural second linear side edges 1708 may be connected in a trapezoidal shape beyond a first elongated edge and a second elongated edge. In one example, the plural first and second linear side edges may be connected in a trapezoidal shape within the first and second elongated edges. In the example illustrated in FIG. 17, the first linear side edges and the second linear side edges may be generally symmetrical, however in other examples, the first linear side edges and the second linear side edges may be asymmetrical. In other examples, the plural first linear side edges may form other polygonal shapes. The shapes and angles of the linear side edges may be selected to distribute the force on the base plate and reduce material loss and shearing, specifically at the side edges.

Figures 18, 19:
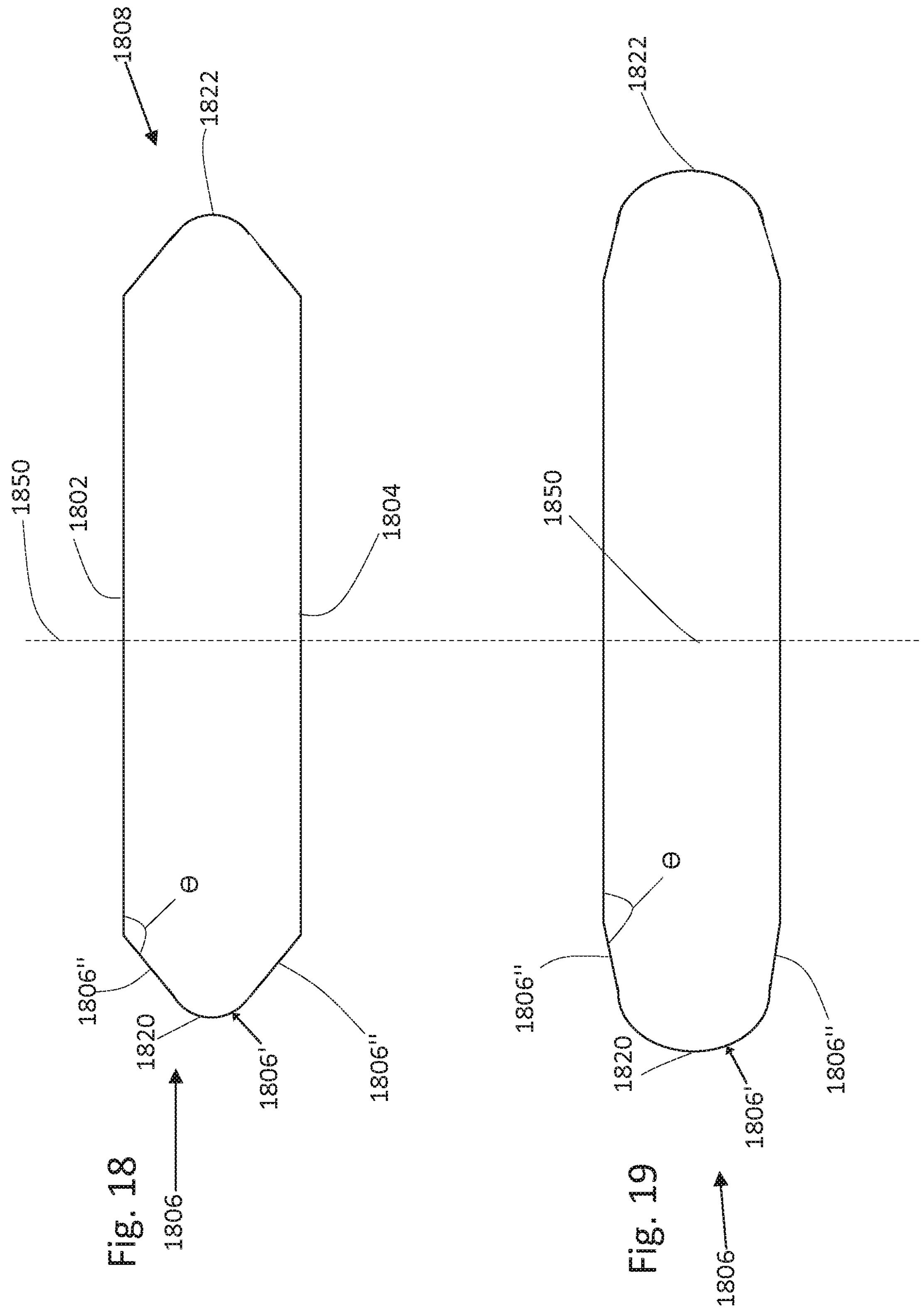
FIG. 18 is a plan view of a back side of a base plate, according to one example.
FIG. 19 is a plan view of a back side of a base plate, according to one example.

In the examples illustrated in FIGS. 18 and 19, at least one of the first side 1806 or the second side 1808 includes a second curved edge 1806' and second linear side edges 1806" on opposite sides of the second curved edge. The second curved edge may extend to a distal point 1820, 1822. The first side and the second side may be symmetrical about a first axis 1850 or asymmetrical about the first axis. In one example, the second linear side edges are generally symmetrical about the second curved edge. In another example, the second linear side edges are asymmetrical about the second curved edge. An angle θ between the second linear side edges and a first elongated linear edge 1802 and/or a second elongated linear edge 1804 may be varied based on the anticipated use of the vehicle. Where the angle may be smaller, the distal point may be closer to the first axis and the slope of the second linear side edges may be greater or steeper, compared to a larger angle. Where the angle may be larger, the distal point may extend further laterally away from the first axis relative to a smaller angle. In some uses, it may be advantageous to have a larger angle, resulting in a more gradual slope of the second linear side edge. In other uses, it may be advantageous to have a smaller angle, resulting in a steeper slope of the second linear side edge.

Figure 20:
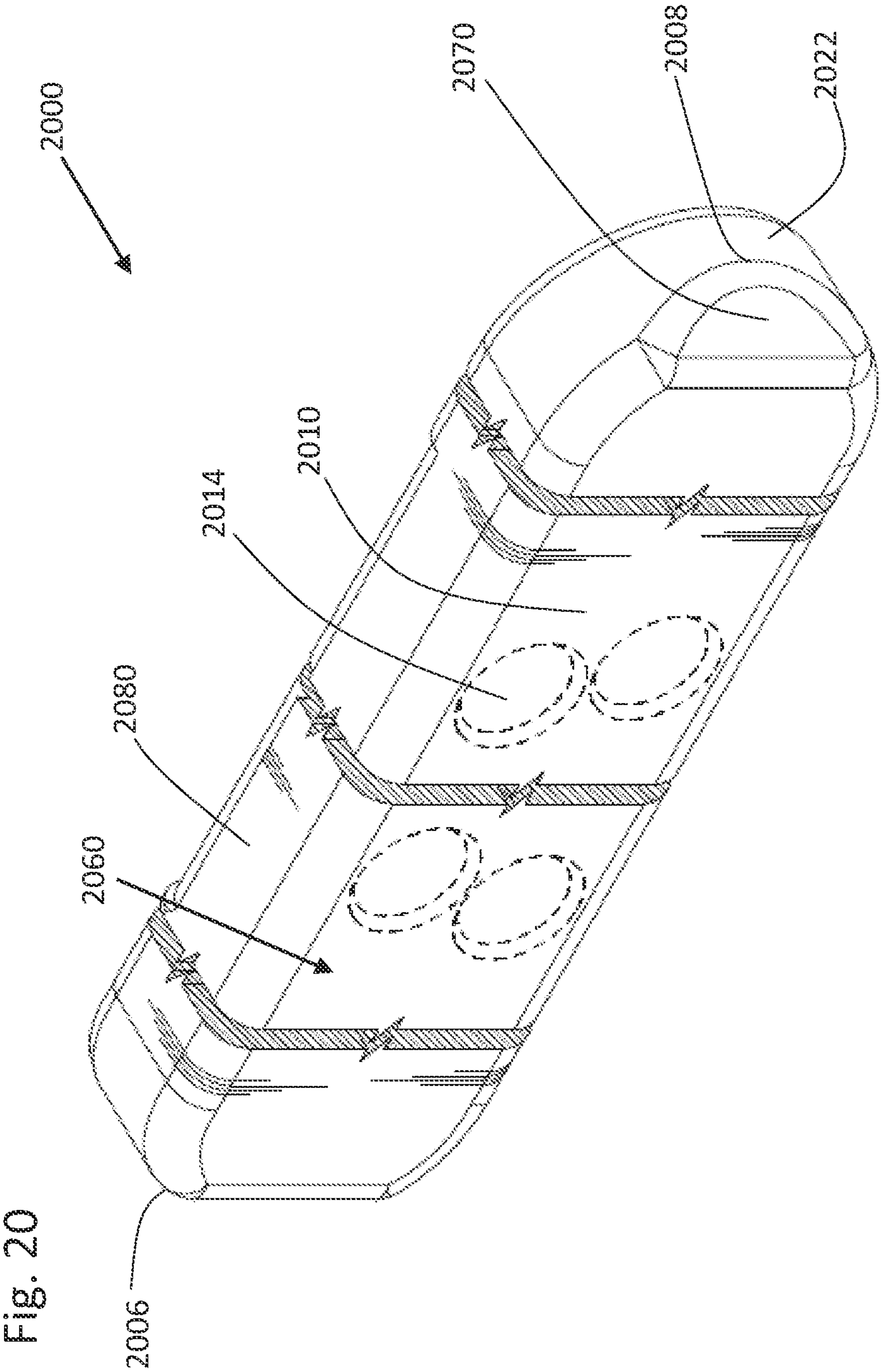
FIG. 20 is a perspective view of a track shoe, according to one example.
Figure 21:
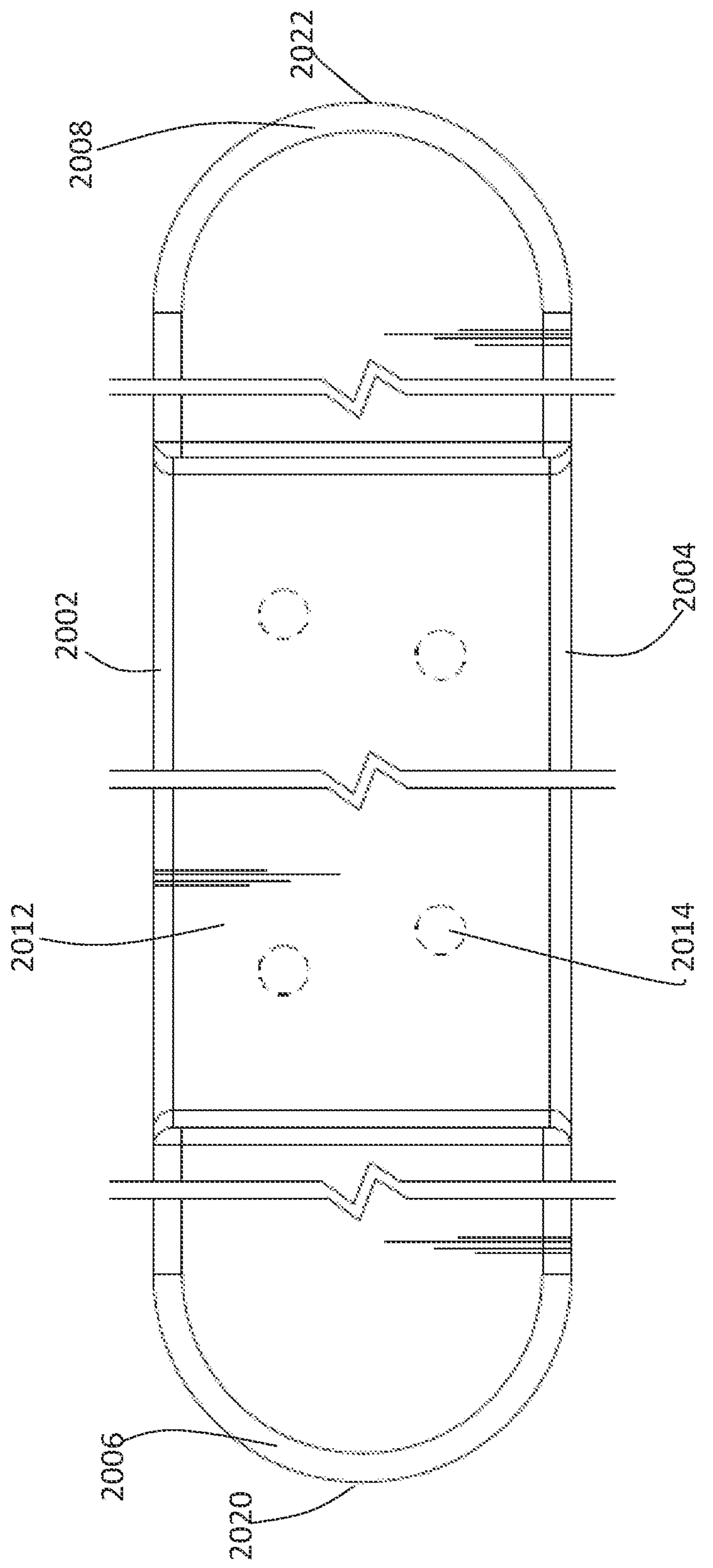
FIG. 21 is a plan view of a back side of the track shoe shown in FIG. 20.

FIG. 20 illustrates a perspective view of a track shoe 2000 for a vehicle pad that may include a base plate and a polymer pad 2060 coupled with the base plate. The track shoe may include a contact surface 2062 that may be positioned to engage the surface being travelled by the vehicle. The track shoe may include an attachment surface 2012 opposite the contact surface. The track shoe and the polymer pad may include apertures 2014 positioned such that fasteners (shown in FIG. 35) may secure the track shoe to the vehicle. The fasteners may include bolts, screws, cylindrical metal shafts welded to the base plate, or the like. The track shoe and polymer pad may be coupled to the vehicle via the attachment surface with the fasteners. The attachment surface and the contact surface may be separated by a top side 2080, shown in FIG. 20. The top side may generally be considered a thickness 2082 of the track shoe. The thickness may be modified based on desired use. The polymer pad may be made of an elastomer such as polyurethane, hardened rubber, a thermoplastic elastomer, or another elastomer. In other examples, the polymer pad may be comprised of a thermoplastic polymer.

The polymer pad is elongated from a first side 2006 to an opposite second side 2008 along a lateral direction. In one example, the first side and the second side may be curved. A first distal end 2020 and a second distal end 2022 may mark the lateral most points of the first side and the second side, respectively. The polymer pad may extend from a first linear edge 2002 to an opposite second linear edge 2004 along a movement direction. The first side may form a continuous curve from the first linear edge to the second linear edge. The second side may form a continuous curve from the first linear edge to the second linear edge.

Figure 22:
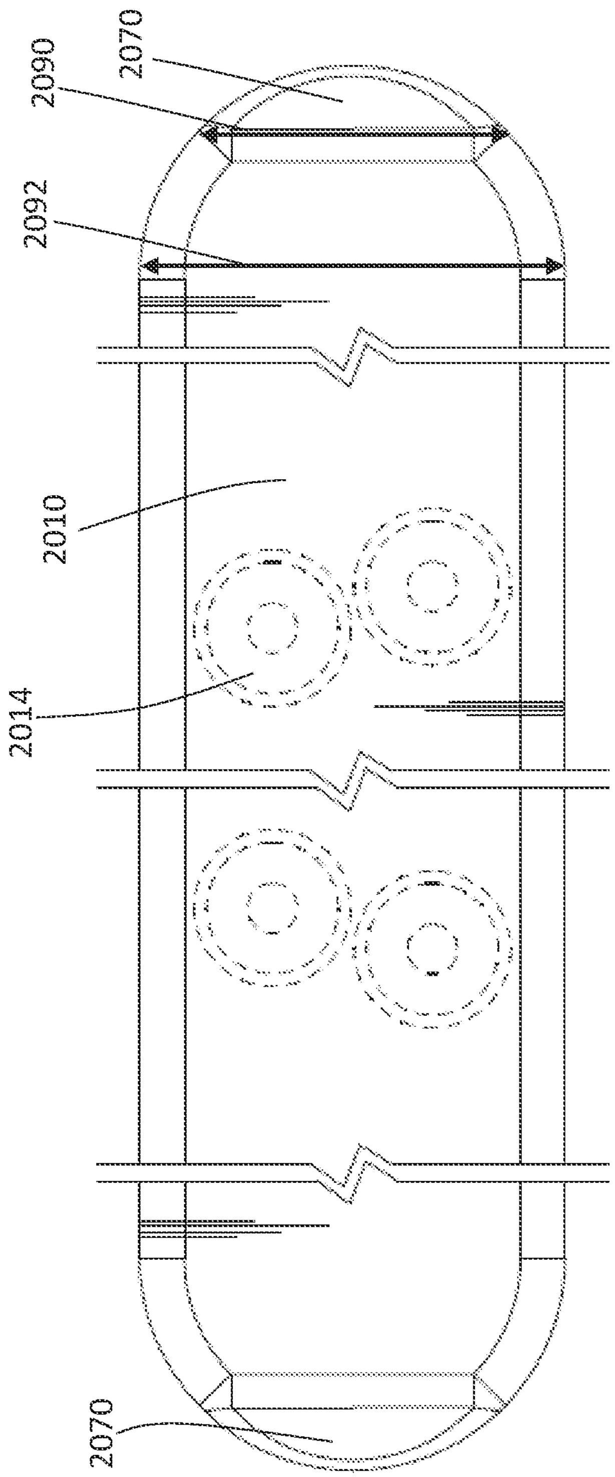
FIG. 22 is a plan view of a front side of the track shoe shown in FIG. 20.
Figure 23:
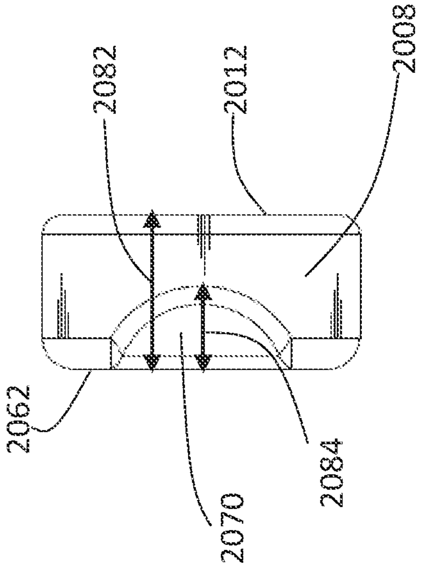
FIG. 23 is a side view of the base plate shown in FIG. 20.
Figure 24:
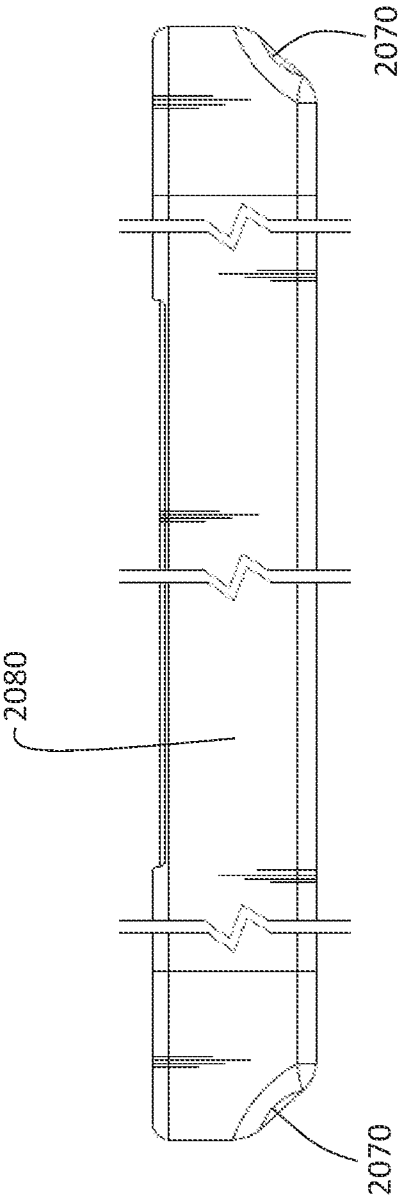
FIG. 24 is a top view of the base plate shown in FIG. 20.

In the example illustrated in FIGS. 20 through 24, the polymer pad may include a middle chamfered surface 2070 disposed at one or more of the first side or the second side. In one example illustrated in FIG. 24, the contact surface may extend in a first plane and the chamfered surface extends in a second plane. The first plane and the second plane may be different in one embodiment and the first plane and the second plane may be the same in another embodiment. The middle chamfered surfaces may be disposed midway between the first linear edge and the second linear edge, along the first side and/or along the second side. In one example, the middle chamfered surface is entirely on the first side and/or the second side. That is, the middle chamfered surface does not extend to the first or second linear edge. In one example, the middle chamfered surface may extend to the first linear edge and/or to the second linear edge. Where the middle chamfered surface extends all the way to the first linear edge, the middle chamfered surface may span the majority of the first side. In one example, the middle chamfered surface may span a portion of the first side or the second side that is less than the entire first or second side, respectively. As discussed above, the first side and the second side extend between the first linear edge and the second linear edge. Thus, a portion of the first side or second side that is less than the entire first or second side may be a portion that does not extend to one or both of the first linear edge or the second linear edge. For example, the middle chamfered surface may span a chamfer length that is 10%, 25%, 50%, 75%, or 90% of the first side or second side, respectively. In one example, the portion of the first side spanned by the middle chamfered surface may be determined based on a chamfer length 2090 of the middle chamfered side compared with a length 2092 the first or second side, as measured between the first linear edge and the second linear edge, as illustrated in FIG. 22. In one example, the middle chamfered surface on the first side may be a mirror image of the middle chamfered surface on the second side. However, in another example, the middle chamfered surface on the first side may be asymmetrical to the middle chamfered surface on the second side. The chamfered surface may have a normal direction that is perpendicular to the direction of movement. In one example, the chamfered surface may have a normal direction that is transversely oriented but not perpendicular to the direction of movement.

The middle chamfered surface(s) may generally be directed to an outward lateral direction. This may help facilitate dirt, debris, and fluid removal away from the track shoe. It may be advantageous for the middle chamfered surface(s) to span a portion of the first side or second side and be directed outward, as this may direct debris and fluid toward the lateral side and may prevent the debris and fluid from being directed toward the first linear edge in the direction of movement.

The middle chamfered surface may include a chamfer depth 2084. The chamfer depth may be measured from the contact surface to the portion of the middle chamfered surface closest to the attachment surface. In one example, the chamfer depth may be a portion of the thickness of the track shoe, for example the chamfer depth may be between 10% and 75% of the thickness of the track shoe. In one example, the chamfer depth may be generally equal to the thickness of the track shoe.

The middle chamfered surface may be formed from one curved line. In one example, the middle chamfered surface may be formed from one or more straight lines. In one example, the middle chamfered surface may include one or more curved lines connected to one or more straight lines. The one or more curved lines may be connected to the one or more straight lines at chamfer boundaries. The middle chamfered surfaces may be generally triangular, however in other examples, the middle chamfered surfaces may include different shapes, such as a trapezoid, rhombus, polygonal shapes, parabola, arc, or other curved shapes. Where the middle chamfered surfaces are disposed closer to the second linear edge than the first linear edge, these middle chamfered surfaces may be referred to as backside middle chamfered surfaces. The backside middle chamfered surfaces may extend toward a leading edge in the direction of forward movement or may extend toward a trailing edge in the direction opposing forward movement.

In one example, the middle chamfered surface may include a channel. The channel may be along a different, lower plane than adjacent middle chamfered surfaces portion. By having the channel that is in a lower plane than the adjacent middle chamfered surfaces, the channel may act to move dirt, debris, fluid, and the like away from the contact surface. In one example, the channel may direct dirt, debris, and fluid laterally outward and away from the contact surface. In one example, the channel and a portion of the adjacent middle chamfered surfaces may be in the same plane. By having the channel and the adjacent middle chamfered surfaces in the same plane, it may prevent dirt, debris, and fluid from getting stuck in the middle chamfered surfaces and may help facilitate debris removal. In one example, the channel may be in a plane above the adjacent middle chamfered surfaces. Having the channel in a plane above the adjacent middle chamfered surfaces may help direct debris away from a central portion of the middle chamfered surface, which may facilitate debris removal.

Figure 25:
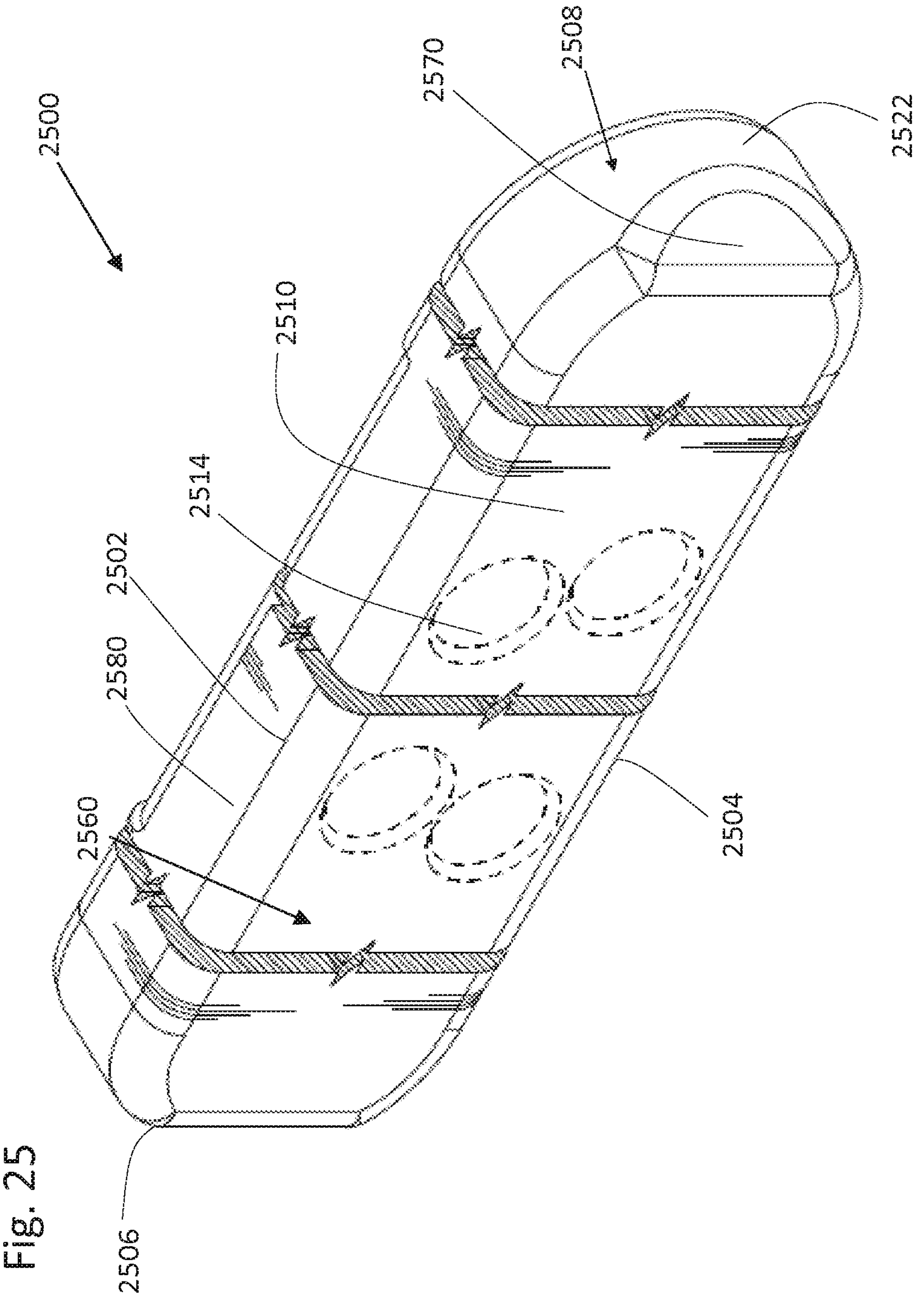
FIG. 25 is a perspective view of a track shoe, according to one example.
Figure 26:
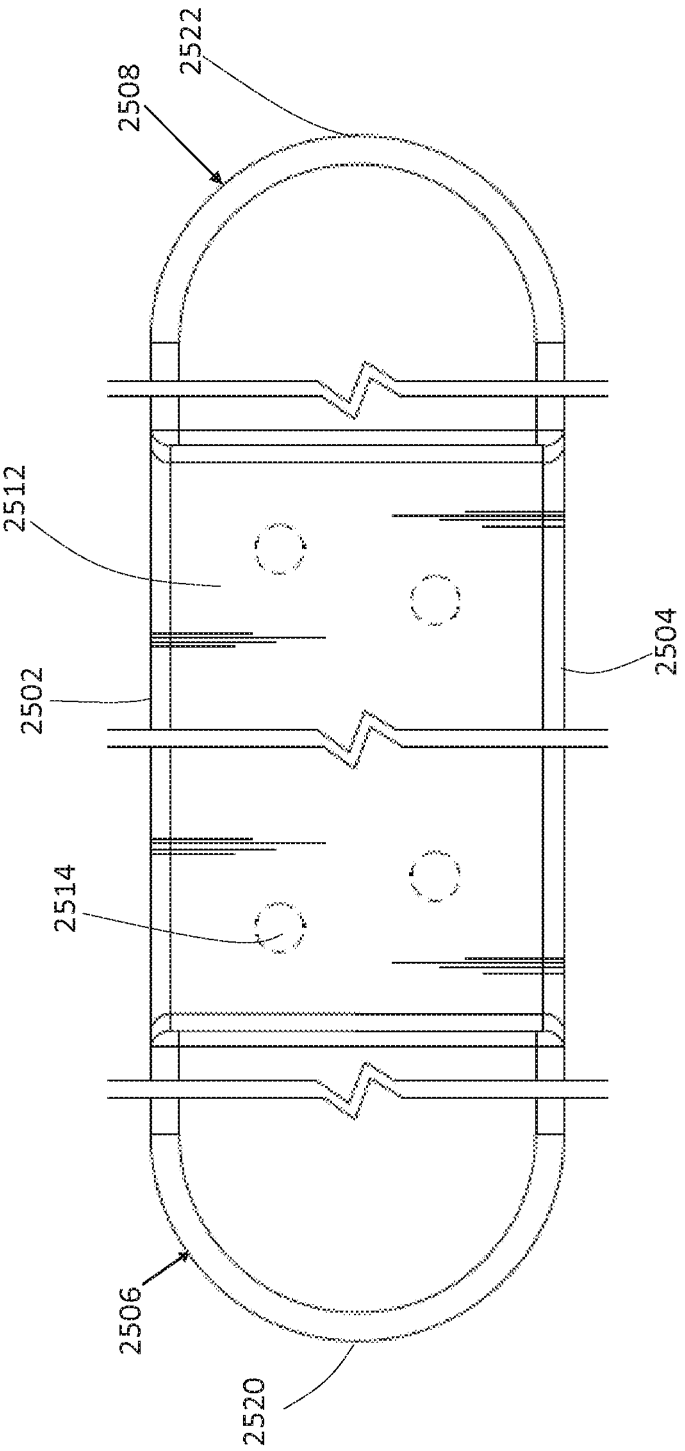
FIG. 26 is a plan view of a back side of the track shoe shown in FIG. 25.
Figure 27:
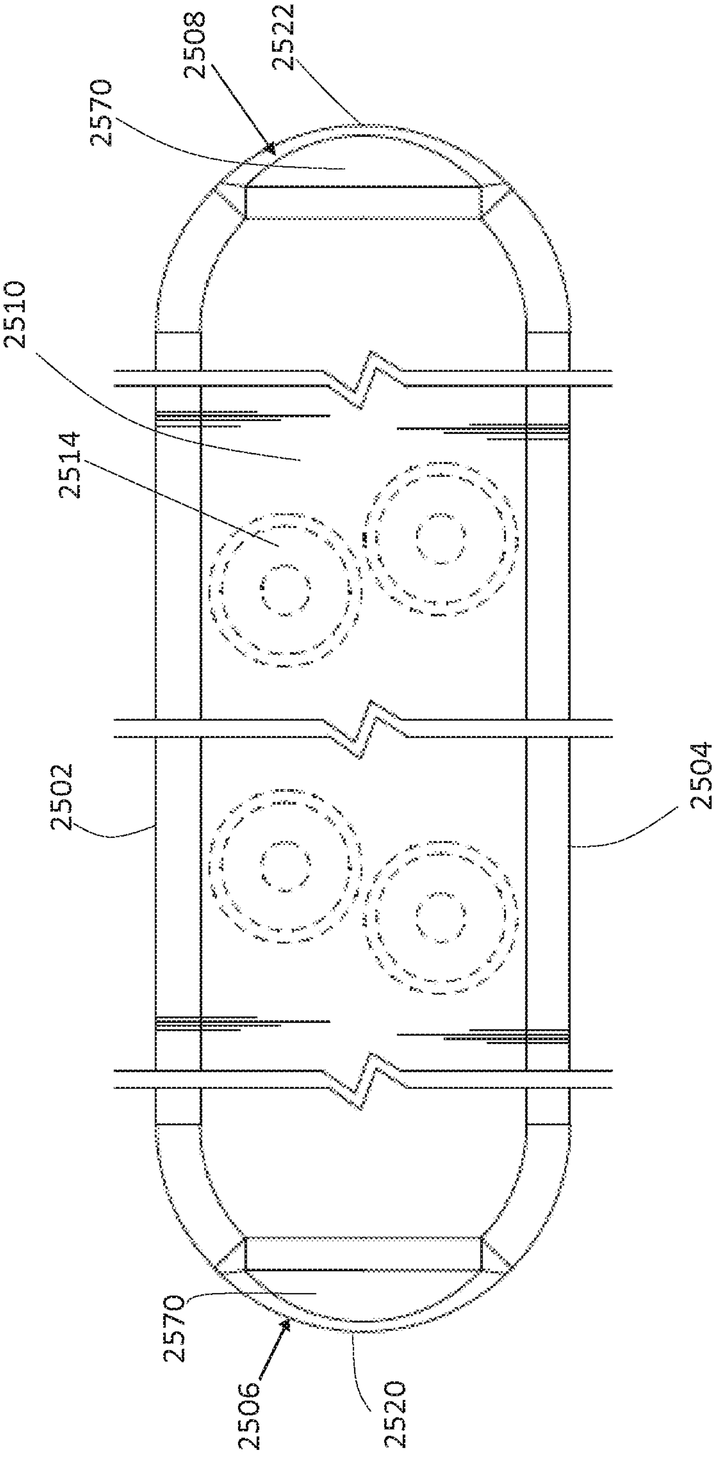
FIG. 27 is a plan view of a front side of the track shoe shown in FIG. 25.
Figure 28:
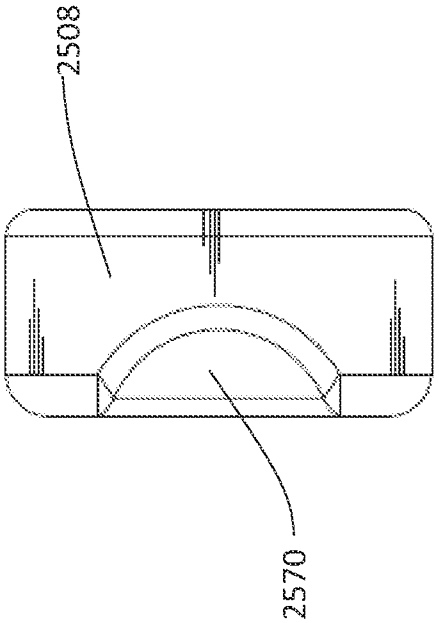
FIG. 28 is a side view of the base plate shown in FIG. 25.
Figure 29:
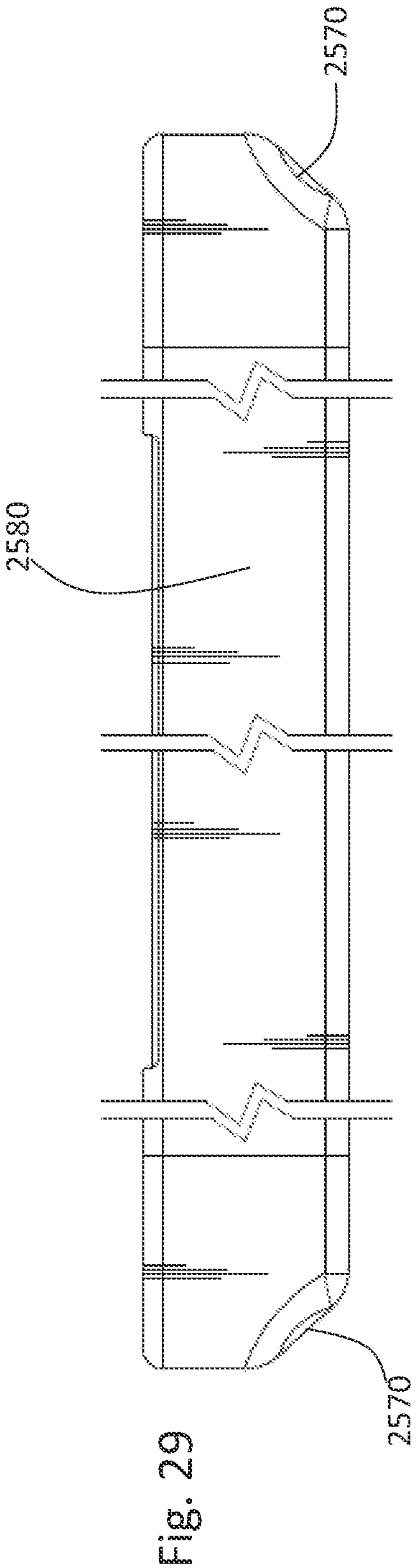
FIG. 29 is a top view of the base plate shown in FIG. 25.

FIG. 25 illustrates a perspective view of a track shoe 2500 for a vehicle pad that includes a base plate and a polymer pad 2560 coupled with the base plate. The track shoe may include a contact surface 2510 that may be positioned to engage the surface being travelled by the vehicle. The track shoe may include an attachment surface 2512 opposite the contact surface. The track shoe and the polymer pad may include apertures 2514 positioned such that fasteners (shown in FIG. 35) may secure the track shoe to the vehicle. The polymer pad is elongated from a first side 2506 to an opposite second side 2508 along a lateral direction. A first distal end 2520 and a second distal end 2522 may mark the lateral most points of the first side and the second side, respectively. The polymer pad extends from a first linear edge 2502 to an opposite second linear edge 2504 along a movement direction.

In the example illustrated in FIGS. 25 through 29, the polymer pad includes a middle chamfered surface 2570 disposed at one or more of the first side or the second side. While the track shoe illustrated in FIG. 25 may have similarities to the track shoe illustrated in FIG. 20, there are some functional and geometric differences. For example, in the embodiment illustrated in FIG. 25, a top side 2580 may have a greater thickness than the top side and thickness illustrated in FIG. 20. The greater thickness may provide more stability and strength for the track shoe. However, a smaller thickness may provide more agility and flexibility for the track shoe. Additionally, in the embodiment illustrated in FIG. 25, a lateral length as measured from the first distal end to the second distal end may be shorter when compared to a length measured from the first distal end to the second distal end illustrated in FIG. 20. While the embodiment shown in FIGS. 20 through 24 may have some similarities to the embodiment shown in FIGS. 25 through 29, the two embodiments may have different geometries, such as having different lateral lengths and different track shoe thicknesses. These differences may help tailor the track shoe to the specific vehicle or performance objective needed.

Figure 30:
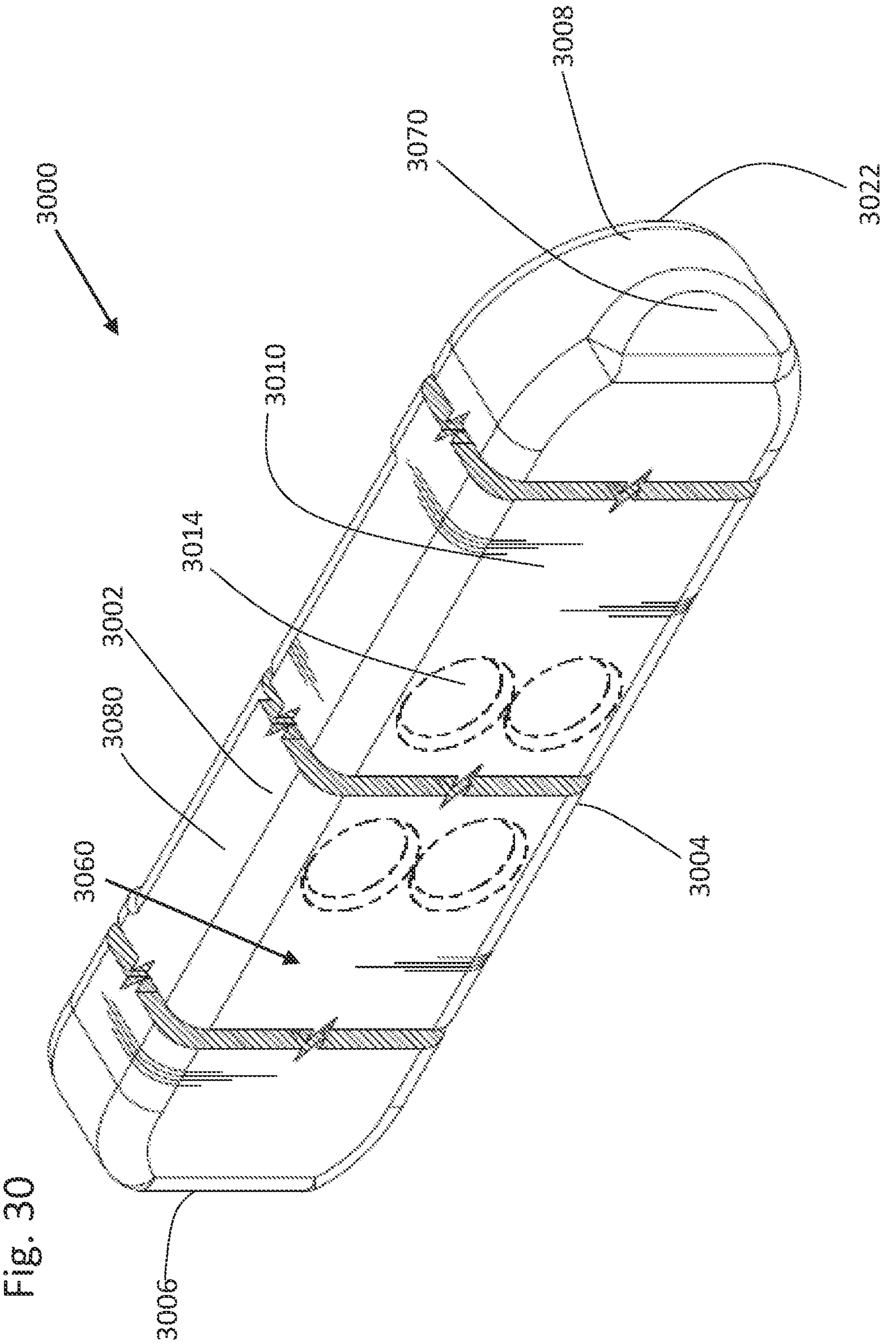
FIG. 30 is a perspective view of a track shoe, according to one example.
Figure 31:
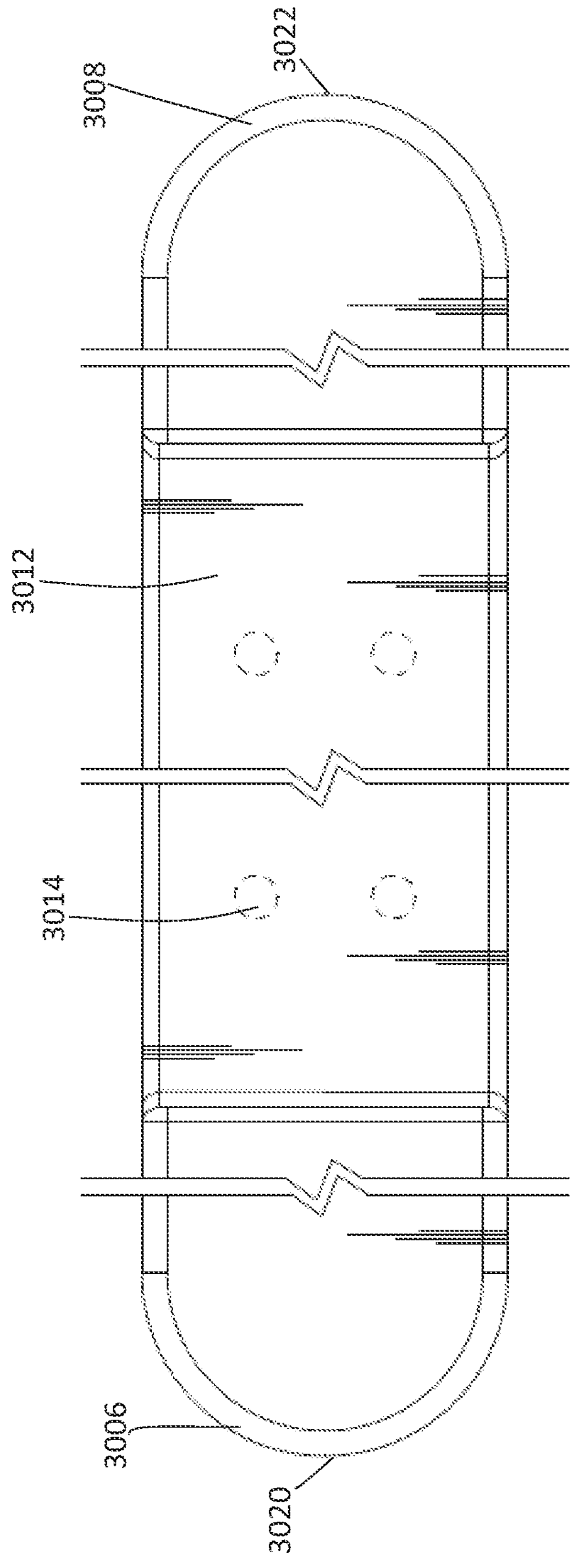
FIG. 31 is a plan view of a back side of the track shoe shown in FIG. 30.
Figure 32:
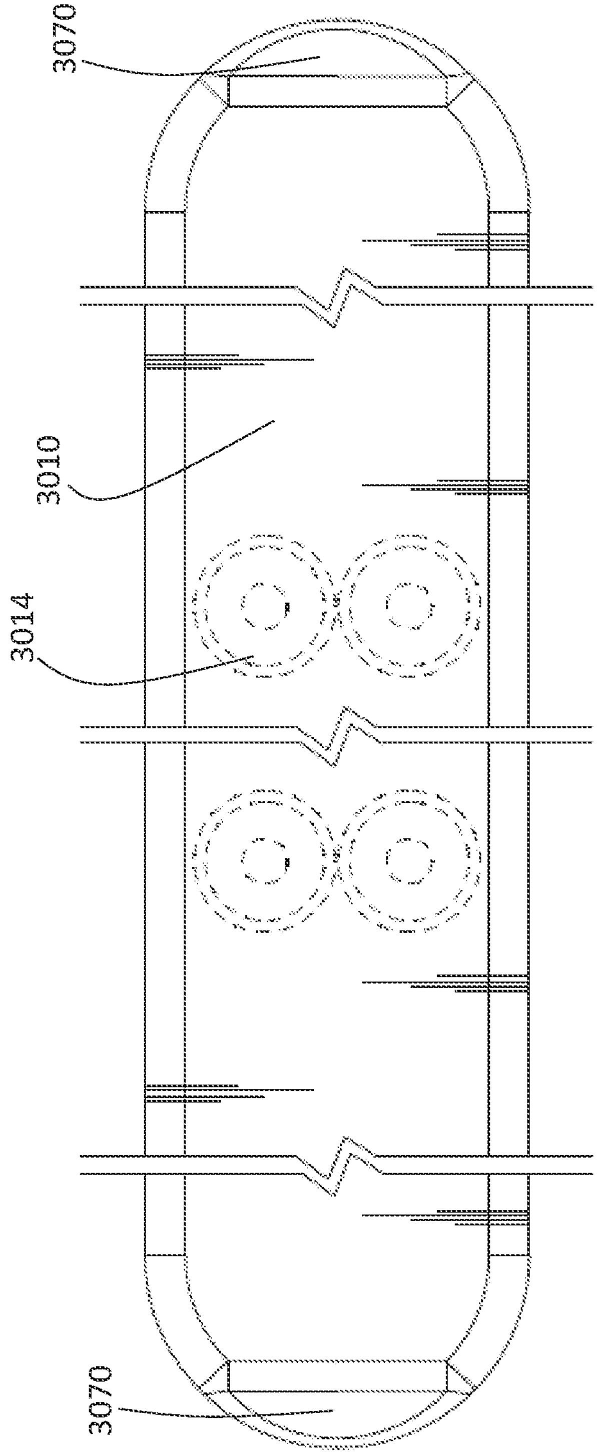
FIG. 32 is a plan view of a front side of the track shoe shown in FIG. 30.
Figure 33:
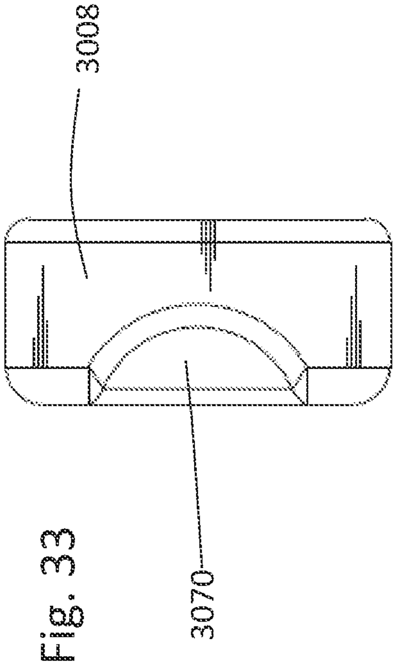
FIG. 33 is a side view of the base plate shown in FIG. 30.
Figure 34:
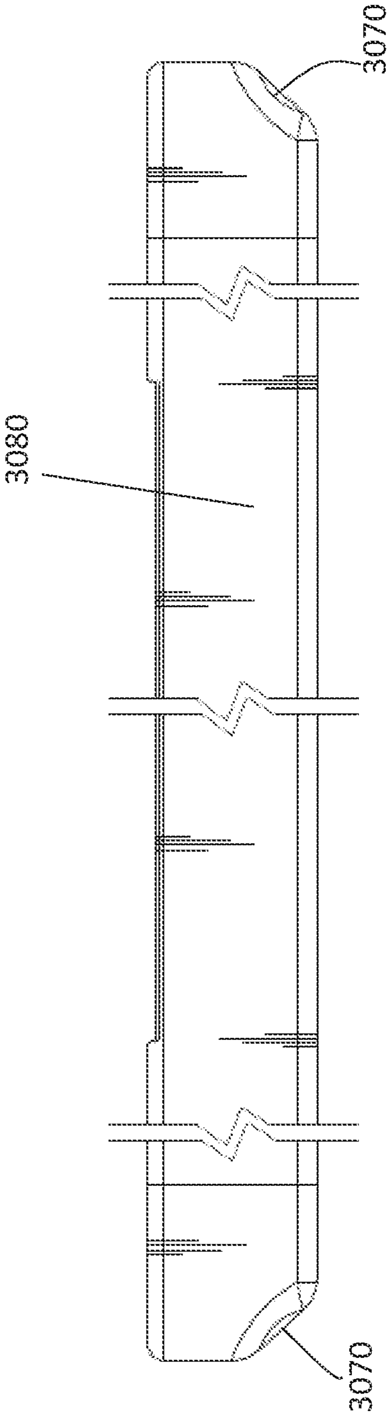
FIG. 34 is a top view of the base plate shown in FIG. 30.

FIG. 30 illustrates a perspective view of a track shoe 3000 for a vehicle pad that may include a base plate and a polymer pad 3060 coupled with the base plate. The track shoe may include a contact surface 3010 that may be positioned to engage the surface being travelled by the vehicle. The track shoe may include an attachment surface 3012 opposite the contact surface. The track shoe and the polymer pad may include apertures 3014 positioned such that fasteners (shown in FIG. 35) may secure the track shoe to the vehicle. The fasteners may include bolts, screws, cylindrical metal shafts welded to the base plate, or the like. The track shoe and polymer pad may be coupled to the vehicle via the attachment surface with the fasteners. The polymer pad is elongated from a first side 3006 to an opposite second side 3008 along a lateral direction. A first distal end 3020 and a second distal end 3022 may mark the lateral most points of the first side and the second side, respectively. The polymer pad may extend from a first linear edge 3002 to an opposite second linear edge 3004 along a movement direction. In the example illustrated in FIGS. 30 through 34, the polymer pad may include a middle chamfered surface 3070 disposed at one or more of the first side or the second side, as well as a top side 3080 as shown.

While the track shoe illustrated in FIGS. 30 through 34 may have similarities to the track shoes illustrated in FIGS. 20 through 29, there may be some functional and geometric differences. For example, in the embodiment illustrated in FIGS. 30 through 34, the apertures to attach the track plate to the vehicle may be aligned both vertically and horizontally with one another. That is, the apertures may generally make a rectangular shape. Whereas the apertures in the embodiments illustrated in FIGS. 20 through 29 may be generally offset from each other in at least one of the vertical or horizontal directions. That is, the apertures may generally make a trapezoidal shape rather than a rectangular shape. The different arrangements of the apertures may provide added strength or flexibility for the attachment of the track shoe to the vehicle.

The polymer pad may extend to an outer boundary that follows the first elongated linear edge, the second elongated linear edge, the first side, and the second side. The outer boundary may follow the perimeter of the base plate. Said another way, the polymer pad may be dimensioned to correspond to the size of the base plate, so that the pad covers all or substantially all of the tread surface of the track plate, e.g., the pad may have a length and width this is the same as the length and width of the plate body. In some embodiments, the outer boundary may define the perimeter of the track shoe. In one embodiment, one or more sides of the polymer pad may protrude out past the base plate in a lateral direction or in a direction of movement.

Additionally, the polymer pad may be attached to the textured surface (s) or the mesh array(s) and to interstitial areas of the traction surface defined by cells of the mesh array(s), for example by press bonding in conjunction with an adhesive. In this manner, a region of interface (contact area) between the track shoe and polymer may be increased (relative to designs without mesh arrays), thereby improving durability and reducing instances of pad shear separation, e.g., the polymer pads may be configured to be attached as part of a continuous track drive of such a vehicle for vehicle movement.

Figure 35:
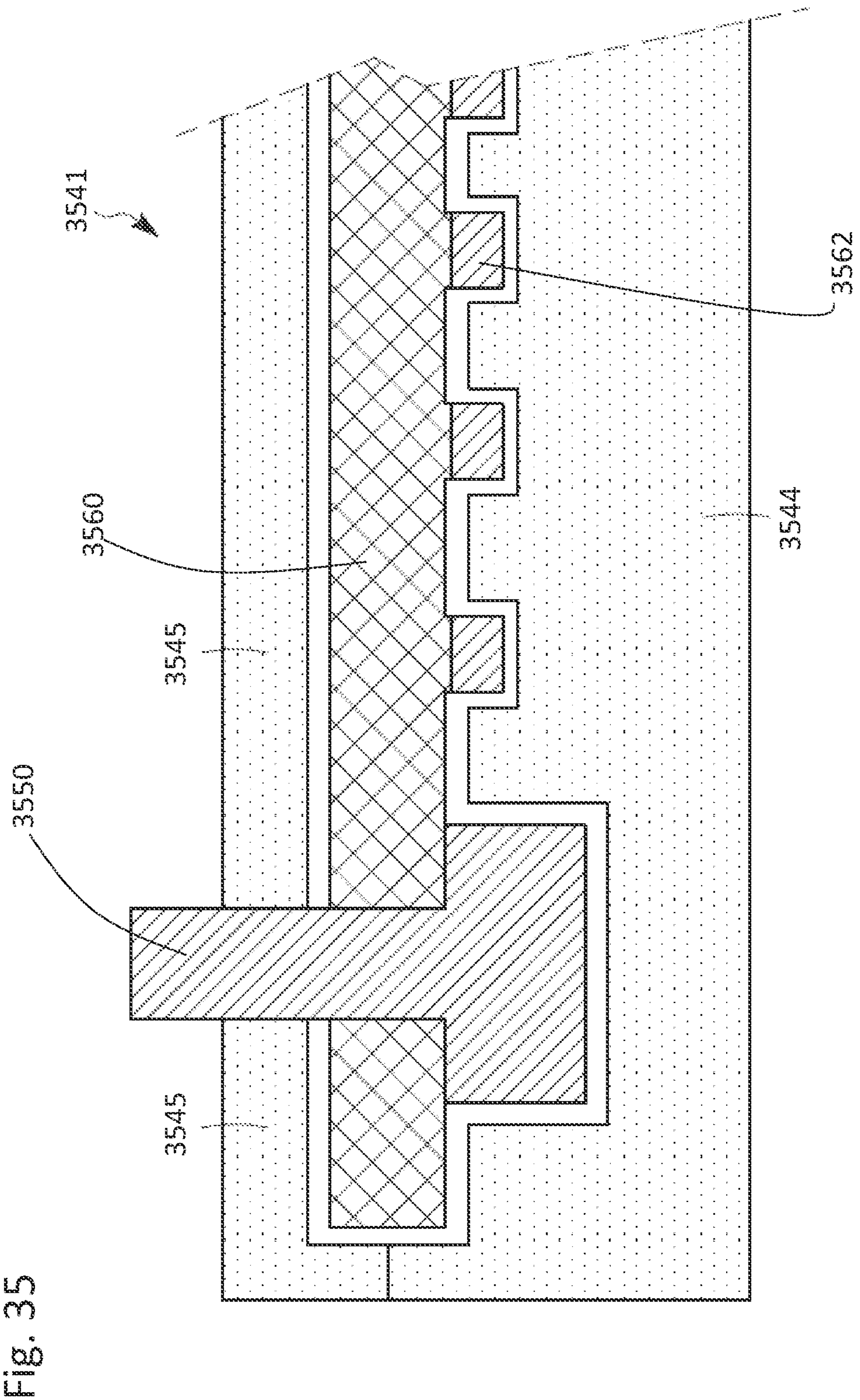
FIG. 35 is a cross-sectional view of a track shoe assembly, according to one example.

FIG. 35 shows a partial cross-sectional view of an example of the track shoe assembly 3541, with the polymer pad in place. A base plate 3560 includes a textured surface or a mesh array 3562. The track shoe assembly includes plural polymer pads, e.g., one pad 3544 disposed on the traction surface of the base plate, and a second pad 3545 disposed on the opposite, attachment surface of the base plate and laterally surrounding a fastener 3550(*s*) (i.e., the fasteners protrude through openings in the second pad). The polymer pad extends around the mesh array. In such an example, the base plate may be fully or at least partially enclosed or encapsulated by or within the pads. This illustrates that in any of the examples herein, a track shoe assembly may include one or more polymer pads, which may partially or fully encapsulate the base plate. In one aspect, although FIG. 35 shows two pads fully or partially enclosing the base plate, there may be one pad that fully or partially encloses the base plate. For example, there may be two or more pad preforms or blanks disposed on either side of the base plate which are then cured during the manufacturing process to bond and merge together at the junction therebetween. In another example, the track shoe may be disposed in a mold, with a liquid polymer introduced into the mold to surround the base plate, which is then cured to harden the polymer around the base plate.

As one example to provide dimensional context, the base plate, if made of steel, may be (approximately) from 130-150 mm wide, 600-800 mm long, and 8-12 mm thick. Other dimensions are possible depending on the base plate material and vehicle characteristics.

Figure 36:
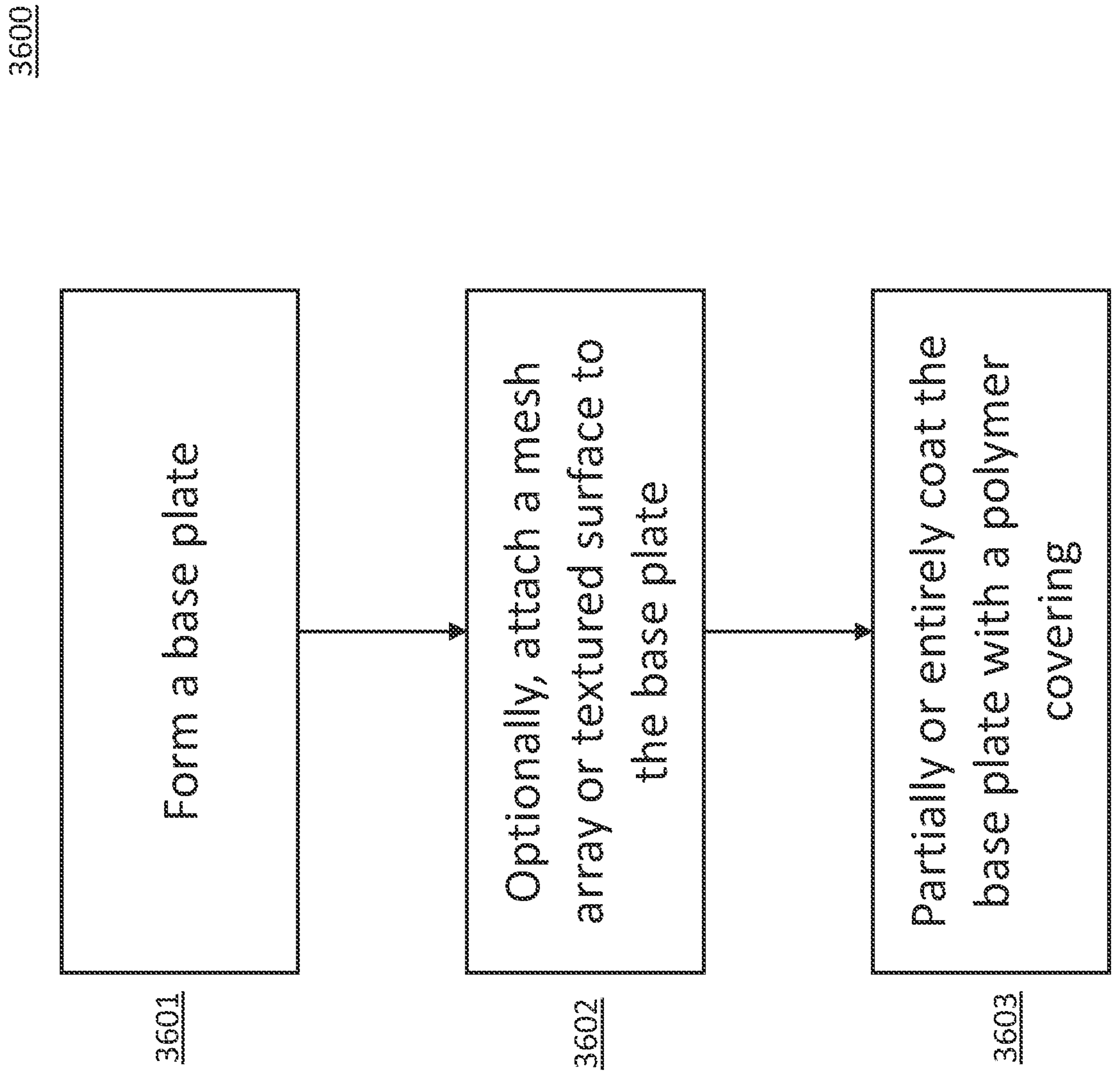
FIG. 36 is a flowchart of a process for manufacturing a track shoe.

FIG. 36 shows a flowchart illustrating a general process for manufacturing a track shoe 3600. At step 3601, the method may include forming a base plate. The base plate may be formed from a metal such as steel, titanium, or aluminum alloy. The base plate may be formed into one or more of the shapes described herein and shown in the corresponding figures.

At step 3602, the method optionally may include attaching a mesh array or other textured surface to the base plate. As discussed above, the mesh array or textured surface may be integral with the base plate or may be separately attached to the base plate.

At step 3603, the method may include partially or entirely coating the base plate with a polymer covering. As discussed herein, the polymer coating may form a polymer pad around the base plate that creates the finished track shoe.

In one embodiment, a track shoe for a vehicle track pad assembly may include a base plate having a first elongated linear edge that may be perpendicular to a first axis of a base plate body that may extend along a movement direction of the base plate. The base plate may have a second elongated linear edge spaced apart from the first elongated linear edge and perpendicular to the first axis. A first side may extend from the first elongated linear edge to the second elongated linear edge. A second side may extend from the first elongated linear edge to the second elongated linear edge. At least one of the first side or the second side may include: (a) a first continuous curved edge extending from the first elongated linear edge to the second elongate linear edge; (b) plural first linear side edges interconnected with each other with at least two of the first linear side edges transversely oriented at non-perpendicular angles to the first elongated linear edge and the second linear edge; (c) a second curved edge and second linear side edges on opposite sides of the second curved edge; or (d) two or more curved edges without any linear edges.

In one example, the second linear side edges may extend from the first elongated linear edge and the second elongated linear edge to the second curved edge. In one example, the first side and the second side may be symmetric about a second axis of the base plate. The second axis may be oriented perpendicular to the first axis. At least one of the first side or the second side may include the first continuous curved edge that is a continuous curve extending from the first elongated linear edge to the second elongated linear edge. A radius of curvature of the first continuous curved edge may be at least 10% of a length of the base plate measured from a first distal end of the first side to a second distal end of the second side along the second axis of the base plate that is perpendicular to the first axis.

In one example, the first elongated linear edge, the second elongated linear edge, the first side, and the second side may all be coplanar. The track shoe may include a polymer pad attached to a traction surface of the base plate. The polymer pad may extend to and have an outer boundary that may follow the first elongated linear edge, the second elongated linear edge, the first side, and the second side.

The base plate may include a textured traction surface. The track shoe may include a textured body coupled with a traction surface of the base plate. The textured body may include at least one mesh array attached to the traction surface of the base plate. The at least one mesh array may fully extend to a first distal end of the first side of the base plate and to a second distal end of the second side of the base plate. A polymer pad may envelop the at least one mesh array.

In one embodiment, a track shoe for a vehicle track pad assembly may include a base plate and a polymer pad coupled with the base plate. The polymer pad may be elongated from a first side to an opposite second side along a lateral direction. The polymer pad may extend from a first linear edge to an opposite second linear edge along a movement direction. The first side may extend from the first linear edge to the second linear edge. The polymer pad may include one or more middle chamfered surfaces disposed at one or more of the first side or the second side. The one or more chamfered surfaces may extend along the first side or the second side a chamfer length that is 90% or less of a length between the first linear edge and the second linear edge.

In one example, each of the one or more middle chamfered surfaces may be disposed midway between the first linear edge and the second linear edge along the first side or along the second side. The one or more middle chamfered surface may span a chamfer length that is no more than 90% of the first side or the second side, as measured from the first linear edge to the second linear edge.

In one embodiment, a track shoe for a vehicle track pad assembly may include a base plate and a polymer pad. The base plate may include a first elongated linear edge that may be perpendicular to a first axis of a base plate body that may extend along a movement direction of the base plate. The base plate may have a second elongated linear edge spaced apart from the first elongated linear edge and perpendicular to the first axis. A first side may extend from the first elongated linear edge to the second elongated linear edge. A second side may extend from the first elongated linear edge to the second elongated linear edge. At least one of the first side or the second side may include: (a) a first continuous curved edge extending from the first elongated linear edge to the second elongate linear edge; (b) plural first linear side edges interconnected with each other with at least two of the first linear side edges transversely oriented at non-perpendicular angles to the first elongated linear edge and the second linear edge; (c) a second curved edge and second linear side edges on opposite sides of the second curved edge; or (d) two or more curved edges without any linear edges. The polymer pad may be coupled with the base plate. The polymer pad may be elongated from a first side of the polymer pad to an opposite second side of the polymer pad along a lateral direction. The polymer pad may extend from a first linear edge of the polymer pad to an opposite second linear edge of the polymer pad along the movement direction. The first side of the polymer pad may extend from the first linear edge of the polymer pad to the second linear edge of the polymer pad. The polymer pad may include one or more middle chamfered surfaces disposed at one or more middle chamfered surfaces extending a chafer length along the first side of the polymer pad or the second side of the polymer pad. The chamfer length may be 90% or less of a length between the first linear edge of the polymer pad and the second linear edge of the polymer pad.

In one example, each of the one or more middle chamfered surfaces may be disposed midway between the first linear edge and the second linear edge along the first side of the polymer pad or along the second side of the polymer pad. The one or more middle chamfered surfaces may span no more than 90% of the first side of the polymer pad or the second side of the polymer pad. The second linear side edges of the base plate may extend from the first elongated linear edge of the base plate and the second elongated linear edge of the base plate to the second curved edge of the base plate.

In one embodiment, a method may include forming a base plate to have a first elongated linear edge that is perpendicular to a first axis of the base plate that extends along a movement direction of the base plate. A second elongated linear edge is spaced apart from the first elongated linear edge and is perpendicular to the first axis. A first side extends from the first elongated linear edge to the second elongated linear edge. A second side extends from the first elongated linear edge to the second elongated linear edge. The base plate is formed such that at least one of the first side or the second side includes: (a) a first continuous curved edge extending from the first elongated linear edge to the second elongated linear edge; (b) plural first linear side edges interconnected with each other with at least two of the first linear side edges transversely oriented at non-perpendicular angles to the first elongated linear edge and the second elongated linear edge; (c) a second curved edge and second linear side edges on opposite sides of the second curved edge; or (d) two or more curved edges without a linear edge.

In one example, the method may include attaching a polymer pad to a traction surface of the base plate. The method may include forming a textured traction surface on the base plate. In one example, the method may include forming a middle chamfered surface on the first side of the base plate.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification, range limitations may be combined and/or interchanged, such ranges may be identified and include all the sub-ranges contained therein unless context or language indicates otherwise.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A track shoe for a vehicle track pad assembly, the track shoe comprising:

a base plate including a first elongated linear edge that is perpendicular to a first axis of the base plate that extends along a movement direction of the base plate;

a second elongated linear edge spaced apart from the first elongated linear edge and perpendicular to the first axis;

a first side extending from the first elongated linear edge to the second elongated linear edge; and a second side extending from the first elongated linear edge to the second elongated linear edge, at least one of the first side or the second side including:

(a) a first continuous curved edge extending from the first elongated linear edge to the second elongated linear edge;

(b) plural first linear side edges interconnected with each other with at least two of the first linear side edges transversely oriented at non-perpendicular angles to the first elongated linear edge and the second elongated linear edge;

(c) a second curved edge and second linear side edges on opposite sides of the second curved edge; or (d) two or more curved edges without a linear edge; and a textured body coupled with a traction surface of the base plate, wherein the textured body includes at least one mesh array attached to the traction surface of the base plate.

2. The track shoe of claim 1, wherein the second linear side edges extend from the first elongated linear edge and the second elongated linear edge to the second curved edge.

3. The track shoe of claim 1, wherein the first side and the second side are symmetric about a second axis of the base plate, the second axis oriented perpendicular to the first axis.

4. The track shoe of claim 1, wherein at least one of the first side or the second side includes the first continuous curved edge that is a continuous curve extending from the first elongated linear edge to the second elongated linear edge.

5. The track shoe of claim 4, wherein a radius of curvature of the first continuous curved edge is at least 10% of a length of the base plate measured from a first distal end of the first side to a second distal end of the second side along a second axis of the base plate that is perpendicular to the first axis.

6. The track shoe of claim 1, wherein the first elongated linear edge, the second elongated linear edge, the first side, and the second side are all coplanar.

7. The track shoe of claim 1, further comprising a polymer pad attached to a traction surface of the base plate.

8. The track shoe of claim 7, wherein the polymer pad extends to and has an outer boundary that follows the first elongated linear edge, the second elongated linear edge, the first side, and the second side.

9. The track shoe of claim 1, wherein the base plate includes a textured traction surface.

10. The track shoe of claim 1, wherein the at least one mesh array fully extends to a first distal end of the first side of the base plate and to a second distal end of the second side of the base plate.

11. The track shoe of claim 1, further comprising a polymer pad enveloping the at least one mesh array.

* * * * *